US011374779B2

(12) United States Patent
Sanders et al.

(10) Patent No.: US 11,374,779 B2
(45) Date of Patent: Jun. 28, 2022

(54) WIRELESS ENABLED DISTRIBUTED DATA APPARATUS AND METHODS

(71) Applicant: Charter Communications Operating, LLC, St. Louis, MO (US)

(72) Inventors: Joshua Sanders, Cincinnati, OH (US); Elliott Hoole, Parker, CO (US); Diwelawatte Jayawardene, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 22 days.

(21) Appl. No.: 16/675,098

(22) Filed: Nov. 5, 2019

(65) Prior Publication Data

US 2020/0412565 A1     Dec. 31, 2020

Related U.S. Application Data

(60) Provisional application No. 62/868,988, filed on Jun. 30, 2019.

(51) Int. Cl.
*H04W 4/00*   (2018.01)
*H04L 12/28*  (2006.01)
(Continued)

(52) U.S. Cl.
CPC .......... *H04L 12/2801* (2013.01); *G06F 3/017* (2013.01); *G06T 11/00* (2013.01); *H04L 67/125* (2013.01); *H04W 4/38* (2018.02)

(58) Field of Classification Search
CPC ... H04W 84/042; H04W 88/06; H04W 88/02; H04W 88/16; H04W 76/14
See application file for complete search history.

(56) References Cited

U.S. PATENT DOCUMENTS

| | | |
|---|---|---|
| 5,793,410 A | 8/1998 | Rao |
| 6,192,403 B1 | 2/2001 | Jong et al. |

(Continued)

FOREIGN PATENT DOCUMENTS

| | | |
|---|---|---|
| EP | 1046259 A2 | 10/2000 |
| KR | 20160097917 A | 8/2016 |

(Continued)

OTHER PUBLICATIONS

Allen, et al., The Case for Run-Time Types in Generic Java, Rice University 2002 pp. 1-6.

(Continued)

*Primary Examiner* — Atique Ahmed
(74) *Attorney, Agent, or Firm* — Gazdzinski & Associates, PC

(57) ABSTRACT

Apparatus and methods for displaying data in an immersive environment wherein sensor (e.g., IoT sensor) data is aggregated via a gateway and various different types of air interfaces depending on application and location (e.g., LoRa, Wi-Fi, 5G NR, C-band, 60 GHz, CBRS, etc.), aggregated at a cloud service, processed through an analytics platform, and transmitted to a UI platform for display on a user interface. One implementation of displaying the sensor data comprises overlaying the sensor data in virtual reality in an immersive video wherein the video is a live stream from a 360-degree 8K camera. A user may interact with the overlaid sensor data within the user interface in a virtual environment to change settings to a desired degree. Artificial intelligence and machine learning may automatically suggest actions to the user or change settings based on sensor data.

22 Claims, 22 Drawing Sheets

(51) Int. Cl.
*H04L 67/125* (2022.01)
*H04W 4/38* (2018.01)
*G06F 3/01* (2006.01)
*G06T 11/00* (2006.01)

(56) References Cited

U.S. PATENT DOCUMENTS

| | | |
|---|---|---|
| 6,216,152 B1 | 4/2001 | Wong et al. |
| 6,252,964 B1 | 6/2001 | Wasilewski et al. |
| 6,542,739 B1 | 4/2003 | Garner |
| 6,546,419 B1 | 4/2003 | Humpleman et al. |
| 6,594,699 B1 | 7/2003 | Sahai et al. |
| 6,728,269 B1 | 4/2004 | Godwin et al. |
| 6,948,183 B1 | 9/2005 | Peterka |
| 6,968,364 B1 | 11/2005 | Wong et al. |
| 6,985,934 B1 | 1/2006 | Armstrong et al. |
| 7,068,597 B1 | 6/2006 | Fijolek et al. |
| 7,103,906 B1 | 9/2006 | Katz et al. |
| 7,159,230 B2 | 1/2007 | Manson et al. |
| 7,178,161 B1 | 2/2007 | Fristoe et al. |
| 7,324,003 B2 | 1/2008 | Yun et al. |
| 7,487,534 B1 | 2/2009 | Peterka et al. |
| 7,552,450 B1 | 6/2009 | Evans et al. |
| 7,617,516 B2 | 11/2009 | Huslak et al. |
| 7,936,254 B2 | 5/2011 | McClenny et al. |
| 8,519,860 B2 | 8/2013 | Johnson et al. |
| 8,653,963 B2 | 2/2014 | Vallaire |
| 9,258,809 B2 | 2/2016 | Liao et al. |
| 9,386,496 B2 | 7/2016 | Gupta et al. |
| 10,484,876 B2 | 11/2019 | Shah et al. |
| 2001/0007138 A1 | 7/2001 | Iida et al. |
| 2001/0049691 A1 | 12/2001 | Asazu |
| 2002/0032754 A1 | 3/2002 | Logston et al. |
| 2002/0038358 A1 | 3/2002 | Sweatt et al. |
| 2002/0044569 A1 | 4/2002 | Bernet et al. |
| 2002/0080038 A1 | 6/2002 | Smith et al. |
| 2002/0122040 A1 | 9/2002 | Noyle |
| 2002/0122656 A1 | 9/2002 | Gates et al. |
| 2002/0174433 A1 | 11/2002 | Baumgartner et al. |
| 2003/0009567 A1 | 1/2003 | Farouk |
| 2003/0009769 A1 | 1/2003 | Hensgen et al. |
| 2003/0110331 A1 | 6/2003 | Kawano et al. |
| 2003/0121054 A1 | 6/2003 | Lorenz |
| 2003/0158906 A1 | 8/2003 | Hayes |
| 2003/0204848 A1 | 10/2003 | Cheng et al. |
| 2003/0229899 A1* | 12/2003 | Thompson ......... H04N 7/17318 725/87 |
| 2003/0231855 A1 | 12/2003 | Gates et al. |
| 2004/0003400 A1 | 1/2004 | Carney et al. |
| 2004/0034697 A1 | 2/2004 | Fairhurst et al. |
| 2004/0040041 A1 | 2/2004 | Crawford |
| 2004/0073944 A1 | 4/2004 | Booth |
| 2004/0078829 A1 | 4/2004 | Patel et al. |
| 2004/0103434 A1 | 5/2004 | Ellis |
| 2004/0107451 A1 | 6/2004 | Khandelwal et al. |
| 2004/0143836 A1 | 7/2004 | McCormack et al. |
| 2004/0181800 A1 | 9/2004 | Rakib et al. |
| 2004/0181811 A1 | 9/2004 | Rakib |
| 2004/0187152 A1 | 9/2004 | Francis et al. |
| 2004/0230754 A1 | 11/2004 | Gumm et al. |
| 2004/0261114 A1 | 12/2004 | Addington et al. |
| 2004/0267965 A1 | 12/2004 | Vasudevan et al. |
| 2005/0027715 A1 | 2/2005 | Casey et al. |
| 2005/0050160 A1 | 3/2005 | Upendran et al. |
| 2005/0162267 A1 | 7/2005 | Khandelwal et al. |
| 2005/0289618 A1 | 12/2005 | Hardin |
| 2006/0055527 A1 | 3/2006 | Pugel et al. |
| 2006/0084417 A1 | 4/2006 | Melpignano et al. |
| 2006/0161946 A1 | 7/2006 | Shin |
| 2006/0168159 A1 | 7/2006 | Weisman |
| 2006/0184661 A1 | 8/2006 | Weisman et al. |
| 2006/0268676 A1* | 11/2006 | Gore ................. H04L 25/0232 370/210 |
| 2007/0004377 A1 | 1/2007 | Medford et al. |
| 2007/0022459 A1 | 1/2007 | Gaebel, Jr. et al. |
| 2007/0156539 A1 | 7/2007 | Yates |
| 2007/0207771 A1 | 9/2007 | Bowser et al. |
| 2007/0237159 A1 | 10/2007 | Yamada et al. |
| 2008/0010506 A1 | 1/2008 | Tabei et al. |
| 2008/0126540 A1 | 5/2008 | Zeng et al. |
| 2008/0313345 A1 | 12/2008 | Bernardin et al. |
| 2009/0034443 A1 | 2/2009 | Walker et al. |
| 2009/0307307 A1 | 12/2009 | Igarashi |
| 2009/0323516 A1 | 12/2009 | Bhagwan et al. |
| 2010/0035610 A1 | 2/2010 | Narang et al. |
| 2010/0070630 A1 | 3/2010 | Ding |
| 2010/0165947 A1 | 7/2010 | Taniuchi et al. |
| 2010/0211793 A1 | 8/2010 | Park et al. |
| 2010/0219976 A1 | 9/2010 | Park et al. |
| 2010/0262722 A1 | 10/2010 | Vauthier et al. |
| 2011/0124335 A1 | 5/2011 | Martin et al. |
| 2011/0130112 A1 | 6/2011 | Saigh et al. |
| 2011/0191321 A1 | 8/2011 | Gade et al. |
| 2011/0270751 A1 | 11/2011 | Csinger et al. |
| 2012/0122428 A1 | 5/2012 | Stephens, Jr. |
| 2012/0210379 A1 | 8/2012 | McCoy et al. |
| 2012/0287452 A1 | 11/2012 | Tsujimoto |
| 2012/0331096 A1 | 12/2012 | Yamaguchi et al. |
| 2013/0007413 A1 | 1/2013 | Thomson et al. |
| 2013/0122903 A1 | 5/2013 | Farnsworth et al. |
| 2013/0136089 A1 | 5/2013 | Gillett et al. |
| 2013/0174223 A1 | 7/2013 | Dykeman et al. |
| 2013/0201316 A1 | 8/2013 | Binder et al. |
| 2013/0219010 A1 | 8/2013 | Mahendran et al. |
| 2013/0238426 A1 | 9/2013 | Mukhopadhyay et al. |
| 2013/0258997 A1* | 10/2013 | Chen ..................... H04W 4/16 370/331 |
| 2013/0266179 A1 | 10/2013 | Jin |
| 2013/0281092 A1 | 10/2013 | Gassend |
| 2013/0288675 A1 | 10/2013 | Gassend |
| 2013/0298157 A1 | 11/2013 | Amsterdam et al. |
| 2013/0315124 A1 | 11/2013 | Rapaport et al. |
| 2014/0035182 A1 | 2/2014 | Boyer et al. |
| 2014/0139422 A1* | 5/2014 | Mistry ..................... G06F 1/163 345/156 |
| 2014/0282704 A1 | 9/2014 | Tumuluru et al. |
| 2014/0282802 A1 | 9/2014 | Bowler et al. |
| 2014/0308986 A1 | 10/2014 | Yang et al. |
| 2014/0354442 A1 | 12/2014 | Maity et al. |
| 2015/0026740 A1 | 1/2015 | Poder et al. |
| 2015/0055623 A1 | 2/2015 | Li et al. |
| 2015/0058861 A1 | 2/2015 | Zheng et al. |
| 2015/0156095 A1 | 6/2015 | Lu |
| 2015/0208262 A1 | 7/2015 | Siomina |
| 2015/0235670 A1* | 8/2015 | Kim ...................... H04N 5/765 386/278 |
| 2015/0280847 A1 | 10/2015 | Somasundaram et al. |
| 2016/0013855 A1 | 1/2016 | Campos et al. |
| 2016/0128072 A1 | 5/2016 | Rajagopal et al. |
| 2016/0234746 A1 | 8/2016 | Gopal et al. |
| 2016/0259923 A1 | 9/2016 | Papa et al. |
| 2016/0330743 A1 | 11/2016 | Das et al. |
| 2017/0094527 A1 | 3/2017 | Shattil et al. |
| 2017/0111846 A1 | 4/2017 | Kang |
| 2017/0149937 A1 | 5/2017 | Ren et al. |
| 2017/0155703 A1 | 6/2017 | Hao et al. |
| 2017/0187966 A1* | 6/2017 | Getting ..................... H04N 7/15 |
| 2017/0208540 A1 | 7/2017 | Egner et al. |
| 2017/0316233 A1 | 11/2017 | Kherani et al. |
| 2018/0034524 A1* | 2/2018 | Pao ......................... H04L 1/1825 |
| 2018/0146058 A1 | 5/2018 | Somayazulu et al. |
| 2018/0181119 A1* | 6/2018 | Lee ..................... G05D 1/0038 |
| 2018/0234635 A1 | 8/2018 | Casella et al. |
| 2018/0235007 A1 | 8/2018 | Gou et al. |
| 2018/0239425 A1* | 8/2018 | Jang ................... G02B 27/0093 |
| 2018/0255576 A1 | 9/2018 | Bhorkar et al. |
| 2018/0279212 A1 | 9/2018 | Malik et al. |
| 2018/0300551 A1* | 10/2018 | Luccin ............... H04N 5/23293 |
| 2018/0316563 A1 | 11/2018 | Kumar et al. |
| 2018/0343685 A1 | 11/2018 | Hart et al. |
| 2018/0351665 A1 | 12/2018 | Fukuta et al. |
| 2018/0351809 A1 | 12/2018 | Meredith et al. |
| 2018/0375887 A1 | 12/2018 | Dezent et al. |
| 2019/0028182 A1 | 1/2019 | Smyth et al. |

(56) References Cited

U.S. PATENT DOCUMENTS

| | | | |
|---|---|---|---|
| 2019/0104551 A1 | 4/2019 | Deenoo et al. | |
| 2019/0109643 A1 | 4/2019 | Campos et al. | |
| 2019/0124572 A1 | 4/2019 | Park et al. | |
| 2019/0150182 A1 | 5/2019 | Koorapaty et al. | |
| 2019/0182895 A1 | 6/2019 | Di Girolamo et al. | |
| 2019/0239190 A1 | 8/2019 | Patel et al. | |
| 2019/0293748 A1* | 9/2019 | Gulati | G01S 7/023 |
| 2019/0319814 A1 | 10/2019 | Das | |
| 2019/0320494 A1 | 10/2019 | Jayawardene et al. | |
| 2019/0364492 A1* | 11/2019 | Azizi | H04W 48/16 |
| 2019/0364565 A1 | 11/2019 | Hmimy et al. | |
| 2019/0379455 A1 | 12/2019 | Wang et al. | |
| 2020/0015147 A1* | 1/2020 | Malkamaki | H04W 40/36 |
| 2020/0053545 A1 | 2/2020 | Wong et al. | |
| 2020/0214065 A1 | 7/2020 | Tomala et al. | |
| 2020/0259896 A1* | 8/2020 | Sachs | G06K 19/06028 |
| 2020/0281008 A1* | 9/2020 | Aboul-Magd | H04L 5/0096 |
| 2020/0351989 A1* | 11/2020 | Ahmet | H04L 63/101 |

FOREIGN PATENT DOCUMENTS

| | | |
|---|---|---|
| WO | WO-2004008693 A1 | 1/2004 |
| WO | WO-2004045125 A2 | 5/2004 |

OTHER PUBLICATIONS

Unity User Manual (2019.4 LTS) found at the Internet address https://docs.unity3d.com/Manual/UnityManual.html, Unity Technologies, copyright 2020, publication date Jan. 11, 2021.

\* cited by examiner

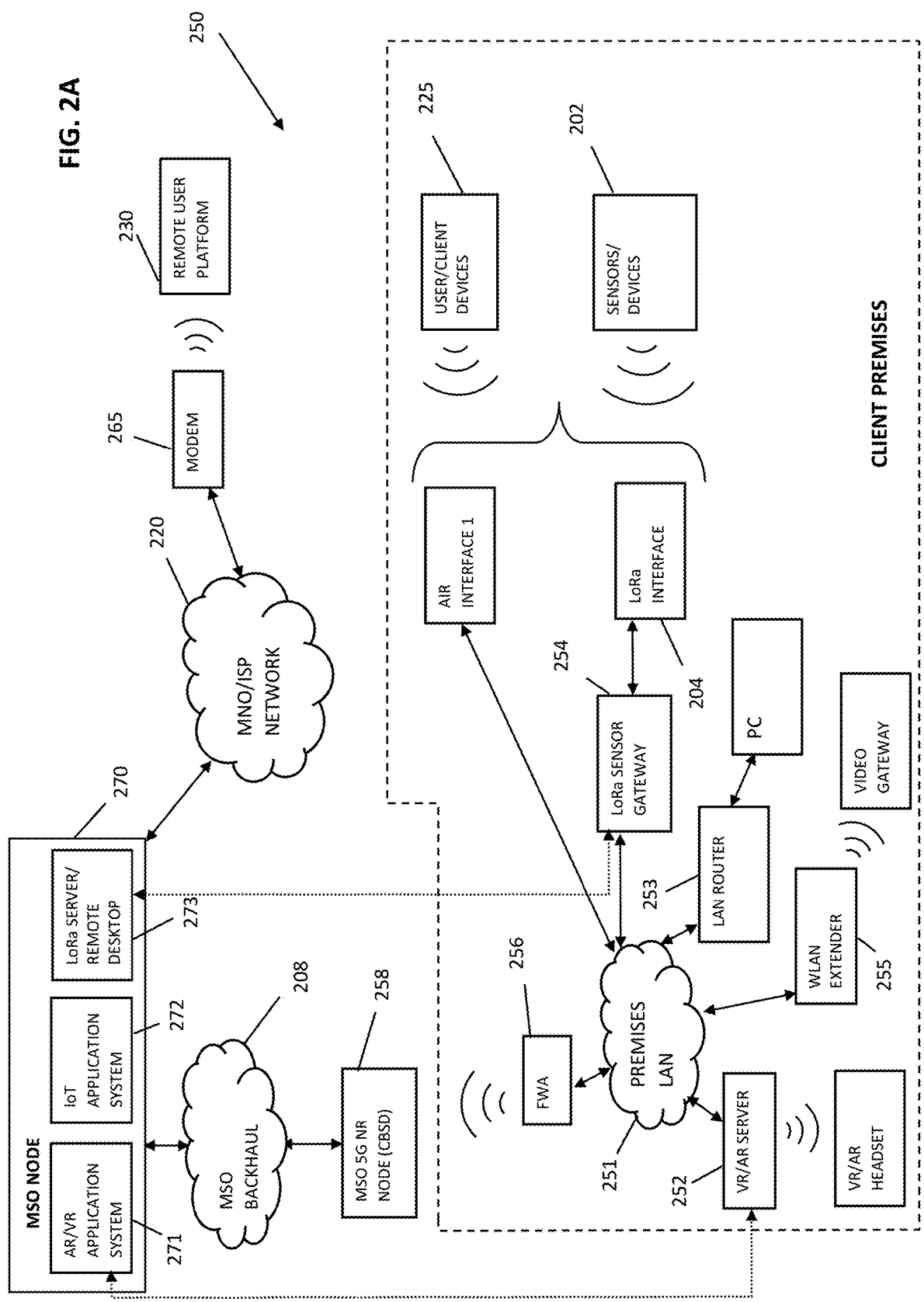

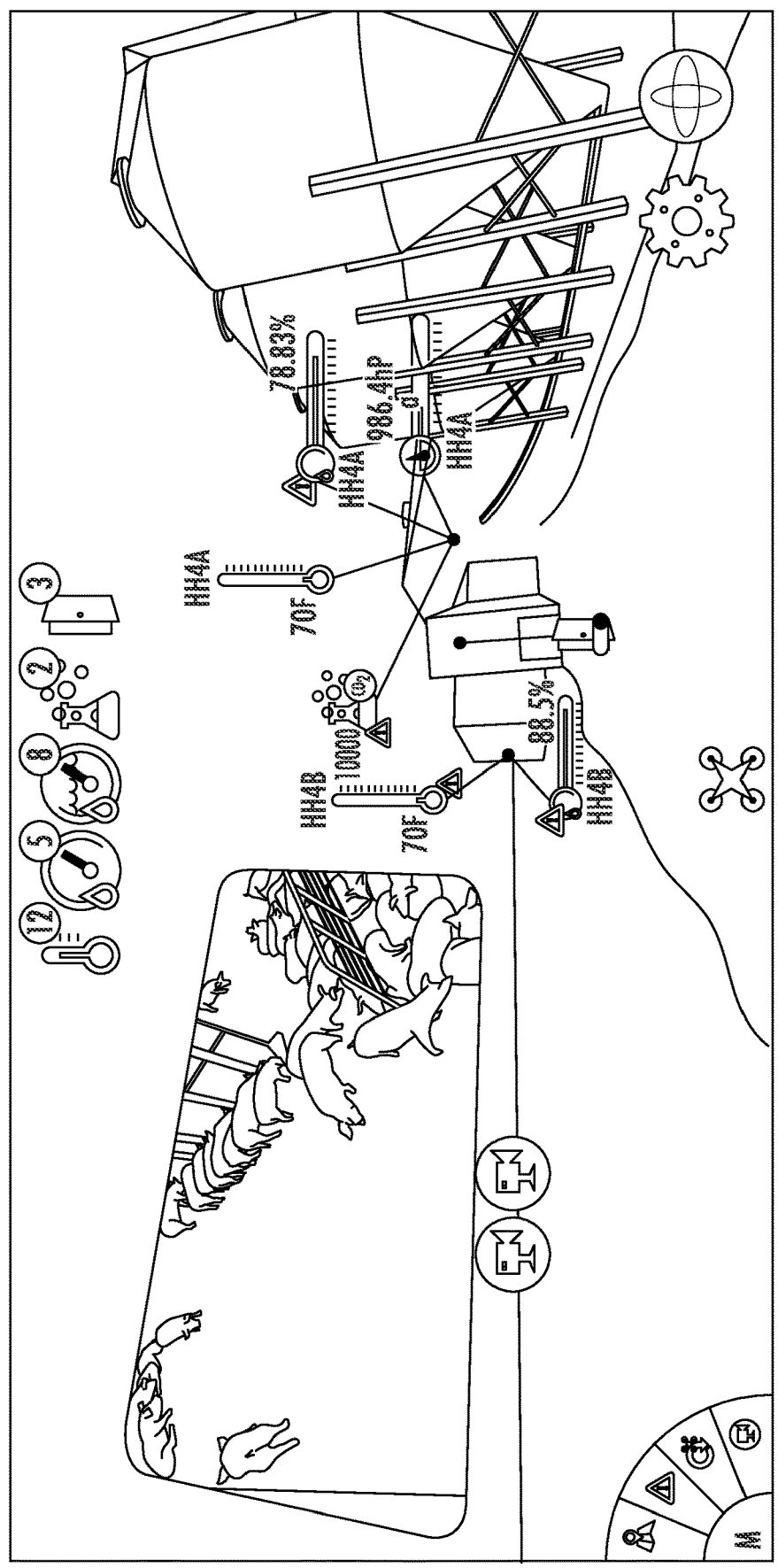

WIRELESS ENABLED DISTRIBUTED DATA APPARATUS AND METHODS

PRIORITY

This application claims priority benefit of U.S. Provisional Patent Application Ser. No. 62/868,988 filed Jun. 30, 2019 and entitled "WIRELESS ENABLED DISTRIBUTED DATA APPARATUS AND METHODS", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally and without limitation to the field of wireless devices and networks thereof, and specifically in one exemplary aspect, the utilization of sensor data and other information in an immersive environment so as to support e.g., facility management.

2. Description of Related Technology

Many industries and applications have evolved over time to become highly complex organizations (from an electronic and data management aspect), implementing and integrating a variety of different functions and activities. For instance, many farms, cities, apartment buildings/houses, warehouses, universities, executive campuses, industrial or public works sites, and hospitals are equipped with a plethora of different electronic systems and associated sensors to monitor everything from humidity to security. Conventional sensors usually only have limited connectivity and tie-in to any centralized logical process or entity, and rely on more ad hoc communications links that are generally short-range in nature and localized in terms of data integration. As such, local or remote integrated monitoring of an entire area equipped with a significant number of heterogeneous sensors cannot be easily achieved. When an issue arises with a monitored area or object, one often cannot monitor the situation remotely, or control or correct the issue from a remote location.

Rural agricultural communities are particularly lacking in this regard; they have historically been the last places to receive access to high-speed networks, and as such any utilization of sensors in an integrated fashion, and distribution of sensor data to remote locations (such as when the facility owner is traveling) is typically quite limited. Often, significant distances are involved (farms may be very large and spread out, as well as located away from major population centers and wireless/telecommunications infrastructure).

Moreover, licensed wireless spectrum (such as via a cellular telephone/data provider), even when available in a given rural area, is often highly spotty and/or unreliable due to e.g., low cell tower density and positioning relative to geographic features. Licensed spectrum is also becoming increasingly crowded, and has several disabilities associated with its use in terms of inter alia spectrum allocation and cost.

Based on the foregoing, there is a salient need for an improved methods and apparatus which would enable a high degree of connectivity and integration for a variety of potentially heterogeneous sensors (and sensor applications), including in rural settings such as those described above. Such improved solutions would ideally include a high degree of wireless coverage and utilization (thereby avoiding largely untenable wireline solutions as much as possible), and such wireless coverage would avoid use of licensed spectrum where practicable in favor of unlicensed or quasi-licensed spectrum (at least at a localized or premises/site level), so as to enhance flexibility and increase user access.

Moreover such enhanced connectivity and integration would allow a user to monitor and control such sensors and associated equipment from a remote location using a generally ubiquitous connection model such as for example TCP/IP over the Internet.

SUMMARY

The present disclosure addresses the foregoing needs by providing, inter alia, methods and apparatus for aggregating, distributing, processing, and displaying (including remotely), sensor and related equipment data in an immersive environment.

In one aspect of the disclosure, an integration environment architecture is disclosed. In one embodiment, the architecture includes a cloud-based data aggregation and analytics entity, a sensor platform, and a user interface application/environment. In one variant, the sensor platform includes a number of sensors disposed at various locations and backhauled by one or more wireless gateways and MSO infrastructure to cloud-based entity. The cloud-based entity processes the aggregated data and generates output, which may include e.g., RTSP-based real-time video and data feeds to the UI application (e.g., on a user's smartphone or PC or other device such as VR/AR headset). In one implementation, 5GNR bearers (e.g., NB-IoT or other) are utilized for at least portions of the backhaul and delivery to the UI platform with minimal latency. In another implementation, one or more 5G NR "slices" are established to support the site-to-cloud-to-user channel.

In a second aspect of the disclosure, a method of operating an integrated sensor and data architecture is disclosed. In one embodiment, the method includes: (i) using a plurality of unlicensed air interfaces at a site to backhaul sensor data to a gateway; (ii) backhauling the gateway to a cloud-based AI/ML processing and aggregation entity; (iii) processing the aggregated sensor data; and (iv) delivering at least a portion of the processed sensor data for delivery to a UI platform. In one variant, the UI platform is a fully-immersive 3D 8K-enabled VR device with an application configured to utilize the "fused" processed In another aspect of the disclosure, a method for displaying data in an immersive environment is described. In one embodiment, the method includes: receiving data from a set of IoT, including NB-IoT, sensors; displaying video of a target environment; and based on the data from the IoT, including NB-IoT, sensors, overlaying display information representative of the data within the video.

In yet another aspect of the disclosure, a distributed data fusion and analytics process is disclosed. In one embodiment, the fusion process comprises one or more computer programs configured to execute on a computerized apparatus to (i) obtain data from a plurality of distributed sensors (e.g., at various locations within a site being monitored and/or controlled); (ii) process the data; and (iii) generate one or more outputs for consumption by a user platform UI environment based on the processing of the data. In one variant, the processing and generation includes generation of one or more high- or ultra-high definition video streams, as well as sensor data streams, for use by the UI environment.

In another aspect, apparatus configured for aggregation and distribution of wireless sensor data is disclosed. In one embodiment, the apparatus includes: a network apparatus configured to wirelessly receive a plurality of sensor data from a plurality of wireless-enabled sensors; and a computerized cloud-based apparatus configured to: receive and aggregate the plurality of sensor data; process the received plurality of sensor data; and cause transmission of the processed plurality of sensor data to an application computer program operative on a user computerized device for display via a user interface thereof.

In one variant, the wireless reception comprises reception of portions of the plurality of sensor data generated by respective ones of the plurality of wireless enabled sensors via respective heterogeneous air interface protocols.

In another variant, the network apparatus is backhauled to an operator network comprising the computerized cloud-based apparatus via a cable modem and HFC (hybrid fiber coax) infrastructure of the operator network.

In another variant, the network apparatus is backhauled to an operator network comprising the computerized cloud-based apparatus via an unlicensed band wireless FWA infrastructure device of the operator network.

In yet another variant, the network apparatus comprises a land-mobile vehicle.

In yet a further variant, the network apparatus comprises a pole- or tower-mounted electronic apparatus having a plurality of antenna elements.

In another aspect, an enhanced wireless access node is disclosed. In one embodiment, the wireless access node comprises a 5G NR gNB device with CU and DU(s), and an AAP process operative to run on at least one of the CU or DU(s) to implement edge-based aggregation and analytics functions in support of target site monitoring and control. In another embodiment, the wireless access node comprises a CBRS CBSD/FWA device with an AAP process operative to run thereon to implement the edge-based aggregation and analytics functions in support of target site monitoring and control.

In a further aspect of the disclosure, a gateway apparatus is disclosed. In one embodiment, the gateway apparatus includes a digital processor apparatus and computerized logic configured to integrate the operation of a plurality of heterogeneous air interfaces used within a customer premises or site, and backhaul data to/from sensor or end user devices served by the heterogeneous air interfaces via a wireline (e.g., DOCSIS CM) or wireless (e.g., CBSD, 5G NR gNB, or millimeter wave system) to an edge or core processing and analytics platform.

In one variant, the gateway apparatus includes a client AAP process (e.g., middleware or firmware or software app) which is communicative with the edge or core AAP process such that the gateway may be configured and controlled by the core AAP process in terms of the functions relevant to the APP core or edge process (e.g., collection of data, "GET" requests to sensor/client devices, transmission of control data, streaming of media to/from the site, etc.)

In a further aspect, computer readable apparatus is disclosed. In one embodiment, the apparatus includes a storage medium having at least one computer program stored thereon, the at least one program configured to, when executed, integrate a plurality of sensor data and streamed video/audio data into a common user interface displayable on a user device. In one variant, the user device comprises a VR or AR device, and the display comprises a display in VR or AR environments.

In one implementation, the video data includes 360-degree "immersive" UHD video data, and the sensor data is overlaid onto the immersive environment. User-accessible icons are used to enable, in VR, user selection of the various icons/functions via VR glove apparatus linked to a VR headset. In this way, the user can be (remotely) immersed in the "actual" environment of the site being monitored.

In another aspect of the disclosure, a system configured for real-time unified monitoring of a plurality of sensor data relating to respective ones of a plurality of functions is disclosed. In one embodiment, the plurality of functions are associated with an operating facility, and the system includes: a LAN (local area network) comprising: FWA (fixed wireless access) apparatus configured for wireless backhaul to at least one serving base station; and a wireless gateway function in data communication with the FWA apparatus and configured to obtain data from a plurality of heterogeneous sensors disposed at respective portions of the operating facility; a plurality of wireless interfaces configured to communicate sensor data from respective ones of the plurality of heterogeneous sensors to the wireless gateway function; and a modified reality (MR) server apparatus in data communication with the LAN and configured to generate MR data for transmission to a MR receiver apparatus, the MR data comprising at least portions of the sensor data received by the wireless gateway function.

In one variant, the fixed wireless access (FWA) apparatus is configured to utilize 3GPP 5G NR (New Radio) Protocols within a quasi-licensed spectrum band to communicate with the at least one serving base station, the at least one serving base station comprising a CBRS CBSD.

In one implementation thereof, the fixed wireless access (FWA) apparatus is configured to utilize 3GPP 4G LTE Protocols within the quasi-licensed spectrum band within an NSA (Non-standalone) mode to establish one or more 5G NR channels between the FWA apparatus and the at least one serving base station.

In another implementation, the MR server apparatus is configured to utilize at least the FWA apparatus for communication with a network-based MR process, the network-based MR process configured to obtain at least a portion of the sensor data associated with the respective ones of the plurality of heterogeneous sensors and process the at least portion of the sensor data to generate, substantially in real time, unified user interface data for transmission to the MR server apparatus.

In a further implementation, the communication with the network-based MR process is configured to utilize a low-latency 5G NR wireless channel, and the network-based MR process is disposed at a micro edge cloud (MEC) node of a network operator.

In another variant, the plurality of wireless interfaces are configured to communicate sensor data from respective ones of the plurality of heterogeneous sensors and comprise at least one LoRaWAN (Long Range WAN) interface configured to at least receive sensor data from a plurality of IoT sensors disposed at respective geographically disparate portions of the operating facility, and wherein the wireless gateway function comprises a LoRaWAN gateway, the LoRaWAN gateway configured to relay the sensor data to a server apparatus.

In a further aspect, a method of operating a facility management and control system is disclosed. In one embodiment, the method includes: obtaining a plurality of data derived from a plurality of different sensors sensing respective ones of operational parameters associated with the facility; obtaining a plurality of at least video data derived from at least one camera associated with the facility; backhauling the obtained plurality of data and plurality of at least video data via a wireless unlicensed spectrum interface to a managed network node, the managed network node comprising at least one sensor data aggregation and processing process; processing the backhauled plurality of data and plurality of at least video data at the managed network node to generate a composite at least video data and sensor data stream for delivery to the facility; and causing delivery of the composite at least video data and sensor data stream to the facility via the wireless unlicensed spectrum interface for consumption thereat by a user of the facility.

In one variant, the consumption comprises rendering of the composite stream using a wireless-enabled modified reality (MR) apparatus worn by the user of the facility, the wireless-enabled MR apparatus enabling the user to roam the facility during said rendering.

In another variant, the method further includes: obtaining user gesture data, the gesture data obtained from the user during said consumption and relating to control of one or more of the plurality of sensors; backhauling the gesture data to the managed network node; processing the backhauled gesture data to determine a user command associated therewith; and based at least on the processing: (i) transmitting data configured to implement the user command to the facility via the wireless unlicensed interface; and (ii) modifying the composite at least video data and sensor data stream prior to delivery to the facility so as to reflect implementation of the user command at the facility.

In another aspect of the present disclosure, a non-transitory computer-readable apparatus is disclosed. In one embodiment, the non-transitory computer-readable apparatus includes a storage medium, the storage medium including a plurality of instructions configured to, when executed by a processor apparatus of a computerized apparatus, cause the computerized apparatus to: obtain video data from at least one video image data apparatus; obtain additional sensor data derived from one or more sensors other than the at least one video image data apparatus; transmit the obtained video data and the obtained additional sensor data to a server via at least a backhaul data interface; and cause generation of composite media data based at least on the transmitted obtained video data and the obtained additional sensor data.

In another aspect of the present disclosure, a computerized apparatus is disclosed. In one embodiment, the computerized apparatus includes: a non-transitory computer-readable apparatus including a storage medium, the storage medium including a plurality of instructions configured to, when executed by a processor apparatus, cause the computerized apparatus to: receive sensor data from a plurality of sensors; receive video data from at least an image data source; enable backhauling of the sensor data and the video data via the one or more data interfaces to a network node of a managed network; and enable generation of composite data from the sensor data and the video data.

These and other aspects shall become apparent when considered in light of the disclosure provided herein.

BRIEF DESCRIPTION OF THE DRAWINGS

FIG. 2A is a functional block diagram showing one implementation of the architecture of FIG. 2, including 3GPP 5G NR backhaul using CBRS spectrum.

FIGS. 7a-7k are graphical representations of various aspects of an exemplary installation and trial of an integrated sensor architecture conducted by the Assignee hereof at a target farm site, including exemplary user interface functions and displays.

Figure 1:
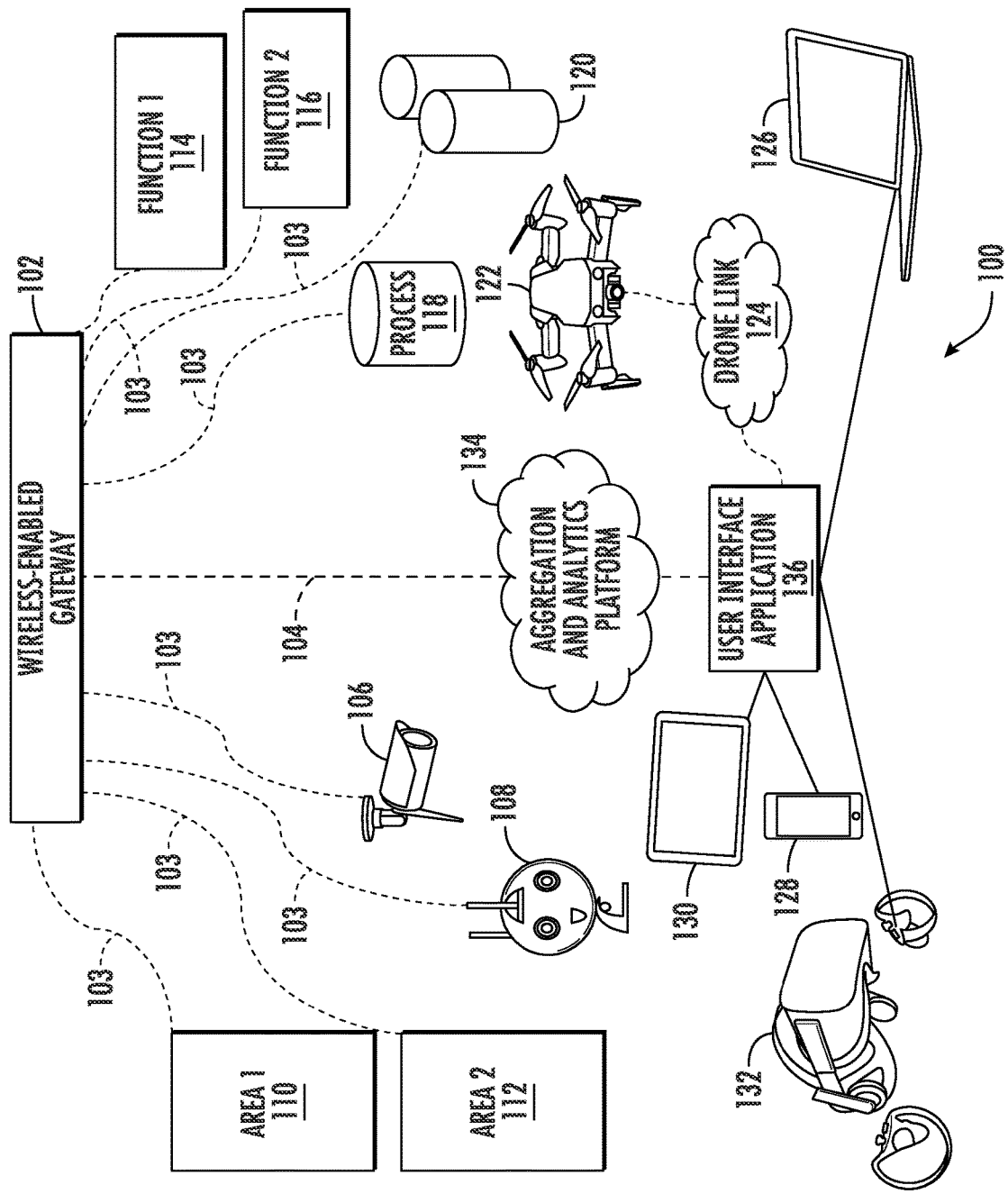
FIG. 1 is a high-level graphical representation of a "smart" architecture and the various components thereof according to one embodiment of the disclosure.

Figures © Copyright 2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband*

Radio Service (CBRS): Spectrum Access System (SAS)—Citizens Broadband Radio Service Device (CBSD) Interface Technical Specification—Document WINNF-TS-0016, Version V1.2.1. 3, Jan. 2018, incorporated herein by reference in its entirety, and any related documents or subsequent versions thereof.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, (G)DDR/2/3/4/5/6 SDRAM, EDO/FPMS, RLDRAM, SRAM, "flash" memory (e.g., NAND/NOR), 3D memory, stacked memory such as HBM/HBM2, spin RAM, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, GPUs, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "modified reality" or "MR" refers without limitation to any form of reality augmentation, change or supplementation such as e.g., virtual reality (VR) and augmented reality (AR), or temporal-shift reality (TSR) (e.g., "future" reality).

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 16, and any modifications, subsequent Releases, or amendments or supplements thereto which are directed to New Radio technology, whether licensed or unlicensed (e.g., NR-U).

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "quasi-licensed" refers without limitation to spectrum which is at least temporarily granted, shared, or allocated for use on a dynamic or variable basis, whether such spectrum is unlicensed, shared, licensed, or otherwise. Examples of quasi-licensed spectrum include without limitation CBRS, DSA, GOGEU TVWS (TV White Space), and LSA (Licensed Shared Access) spectrum.

As used herein, the term "SAE (Spectrum Allocation Entity)" refers without limitation to one or more entities or processes which are tasked with or function to allocate quasi-licensed spectrum to users. Examples of SAEs include SAS (CBRS), PMSE management entities, and LSA Controllers or Repositories.

As used herein, the term "server" refers to any computerized component, system or entity regardless of form which is adapted to provide data, files, applications, content, or other services to one or more other devices or entities on a computer network.

As used herein, the term "sensor" is intended to include not only sensing apparatus such as for sensing one or more parameters associated with a process, component, system or similar, but also visual, IR, acoustic, electromagnetic, tactile, and other forms of sensor (e.g., security cameras, IR sensor feeds, microphone/acoustic feeds), as well as controlled apparatus such as for example valves, switches, lighting, HVAC, processing equipment, cameras or IR sensors, acoustic monitoring, door locks, computer equipment, wireless infrastructure, robots and robotically assisted devices, and machinery.

As used herein, the term "shared access" refers without limitation to (i) coordinated, licensed sharing such as e.g., traditional fixed link coordination in 70/80/90 GHz and the U.S. FCC's current rulemaking on potential database-coordinated sharing by fixed point-to-multipoint deployments in the C-band (3.7-4.2 GHz); (ii) opportunistic, unlicensed use of unused spectrum by frequency and location such as TV White Space and the U.S. FCC's proposal to authorize unlicensed sharing in the uplink C-band and other bands between 5925 and 7125 MHz; (iii) two-tier Licensed Shared Access (LSA) based on geographic areas and database assist such as e.g., within 3GPP LTE band 40 based on multi-year sharing contracts with tier-one incumbents; and (iv) three-tier shared access (including quasi-licensed uses) such as CBRS.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ad/ax, 802.11-2012/2013 or 802.11-2016, as well as Wi-Fi Direct (including inter alia, the "Wi-Fi Peer-to-Peer (P2P) Specification", incorporated herein by reference in its entirety).

As used herein, the term "wireless" refers to any non-wired interface, whether electromagnetic, optical, capacitive, inductive, acoustic, or other in nature. Common wireless standards include but are not limited to 3GPP-based (e.g., LTE, 5G NR), Wi-Fi, WiMAX, Bluetooth (including BLE), IEEE Std. 802.15.4, LoRA, C-Band, and CBRS, and may be short (e.g., PAN or WLAN), or longer range (MAN/WAN/cellular) in nature.

Overview

In one exemplary aspect, the present disclosure provides methods and apparatus for, inter alia, acquiring, processing and displaying data from a monitored site or aggregation of sites wherein sensor data (e.g., from IoT-based or other sensors) data is aggregated via two or more wireless access technologies (including LoRa, Wi-Fi (e.g., 802.11ac/ad/ax/ay in mmWave), 5G NR, C-band, and/or CBRS), collected on a "cloud" service such as one maintained by a service provider or network operator (e.g., MSO or MNO), processed through an analytics platform, and displayed on a user interface (which may be local or remote to the site).

One implementation of displaying the sensor data comprises overlaying the sensor data in virtual reality within an immersive video, wherein the video comprises a live stream from a 360-degree 8K camera. Disclosed network implementations advantageously support the latency requirements to stream the ultra-high definition 360-degree video. Further, a user may interact with the overlaid sensor data within the user interface of the virtual environment, such as to change settings to a desired degree or implement other control functions at the site(s). Moreover, artificial intelligence and machine learning operative within the cloud may automatically suggest actions to the user or change settings based on sensor data, as well as identifying commonalities across multiple different customers or sites served by the network operator or service provider.

Another variant provides a webpage dashboard to the user, such as may be rendered on a smartphone, tablet, PC or smart TV.

In one embodiment, the system collects sensor data and implements downstream control functions using only using only C-band and LoRa. Another embodiment uses 60 GHz (e.g., via 802.11ad) and 5G NR are used to collect sensor data. In one embodiment, C-band within the 3.7 to 4.2 GHz range is used for some of the communications. In an alternate embodiment, CBRS is implemented to collect IoT sensor data, and/or provide backhaul from the site.

Moreover, the various aspects of the present disclosure can be implemented within the existing base of sensors with little to no modification; i.e., each sensor merely uses existing software, firmware, and indigenous wireless capabilities (e.g., WLAN such as 802.11g/n/ac, BLE, or other PAN such as ZigBee or IEEE Std. 802.15.4).

One such application of the disclosure is to a "smart" farm. However, the same connectivity and operations described in the context of a smart farm may be applied and utilized in various other applications including enterprise, manufacturing, public works and facilities maintenance, city or town infrastructure, and educational facilities such as university campuses, among others.

Advantageously, the flexibility of the exemplary solution provided herein in terms of use of varying air interfaces and wireless technology allows for ready adaptation to remote sites, including those with comparatively "difficult" topology such as when disposed in mountainous areas.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access networks (e.g., 5G, LoRa, WLAN/60 GHz, C-Band, CBRS) associated with or supported at least in part by a managed network of a service provider (e.g., MSO and/or MNO networks), other types of radio access technologies ("RATs"), other types of networks and architectures that are configured to transact digital data (e.g., text, images, software applications, video and/or audio) may be used consistent with the present disclosure. Such other networks or architectures may be broadband, narrowband, or otherwise, the following therefore being merely exemplary in nature.

It will also be appreciated that while described primarily in the context of a network providing unlicensed or quasi-licensed spectrum service to a customer or consumer or end user or subscriber (i.e., within a prescribed service area, organization, or other type of premises), the present disclosure may be readily adapted to other types of environments including, e.g., urban environments, industrial environments, commercial/retail environments, or enterprise domain environments (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Referring now to FIGS. 1-7y, various embodiments of the apparatus, systems, and methods according to the present disclosure are shown and described in detail. It will be appreciated that while these apparatus, systems, and methods are described primarily in the context of a 3GPP-based (i.e., 5G NR) and unlicensed architecture, the present disclosure is in no way so limited, and may be readily adapted and applied to other types or configurations of wireless network such as for instance MulteFire™-based networks, such adaptation and application being within the skill level of the ordinary artisan given the present disclosure.

Wireless infrastructure implementations discussed herein may also be implemented in any number of different manners as discussed in, for instance, co-owned U.S. patent application Ser. No. 15/677,940 filed Aug. 15, 2017 entitled "METHODS AND APPARATUS FOR DYNAMIC CONTROL AND UTILIZATION OF QUASI-LICENSED WIRELESS SPECTRUM", and issued as U.S. Pat. No. 10,536,859 on Jan. 14, 2020, as well as Ser. No. 15/785,283 filed Oct. 16, 2017 entitled "METHODS AND APPARATUS FOR COORDINATED UTILIZATION OF QUASI-LICENSED WIRELESS SPECTRUM," and issued as U.S. Pat. No. 10,340,976 on Jul. 2, 2019, and Ser. No. 15/814,133 filed Nov. 15, 2017 entitled "METHODS AND APPARATUS FOR UTILIZATION OF QUASI-LICENSED WIRELESS SPECTRUM FOR IOT (INTERNET-OF-THINGS) SERVICES," and issued as U.S. Pat. No. 10,492,204 on Nov. 26, 2019, and Ser. No. 16/216,835 filed Dec. 11, 2018 and entitled "APPARATUS AND METHODS FOR INTEGRATED HIGH-CAPACITY DATA AND WIRELESS NETWORK SERVICES," each of the foregoing incorporated herein by reference in its entirety.

Notably, the portions of the architecture described are not inherently limited by their medium and architecture (i.e., optical fiber transport ring, with coaxial cable toward the edges). Achievable round-trip latencies in LTE (UL/DL) are on the order of 2 ms (for "fast" UL access, which eliminates need for scheduling requests and individual scheduling grants, thereby minimizing latency, and shorter TTI, per Release 15), while those for 5G NR are one the order of 1 ms or less, depending on transmission time interval frequency (e.g., 60 kHz).

Notably, a significant portion of 4G/4.5G transport latency relates to network core and transport (i.e., non-edge) portions of the supporting infrastructure.

Various embodiments of the present disclosure allow for massive connections in 5G, and leverage low power WAN. The low latencies achieved allow for, inter alia, streaming 360-degree 8K video coupled to a virtual reality user interface (which in some embodiments is supported by a network-based VR/AR process in support of generating a unified user interface locally at the site) for monitoring sensors.

Moreover, utilization of different air interface technologies for various type of applications provides enhanced flexibility, as well as enhancing system overall reliability and utilization of unlicensed or quasi-licensed spectrum (and thereby avoiding the disabilities associated with use of licensed spectrum). For instance, one implementation uses LoRaWAN ("LoRa"). A LoRa network architecture may use for example one or more gateways to act as transparent bridges relaying data and messages between end-devices and a central network server (e.g., the AAP described herein, or other processes) in the backend. LoRa gateways are connected to the network server via standard IP connections, while end-devices use single-hop wireless communication to one or many gateways. With LoRa, end-point communication is generally bi-directional, but also supports operation such as multicast, enabling software upgrade over the air or other mass distribution messages to reduce the on-air communication time. LoRa is implemented to, inter alia, maximize both battery life of the sensors and overall network capacity.

Wireless Enabling Technologies

A wide variety of wireless technologies (licensed, unlicensed, or quasi-licensed) are available to facilitate various of the communications between the sensors, gateway(s), AAP, and UI platform of the present disclosure. As a brief aside, some of these technologies are now described in greater detail.

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS. Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

5G New Radio (NR)

5G New Radio (NR) and NG-RAN (Next Generation Radio Area Network) and narrowband IoT (NB-IoT) provide for the wireless aggregation of sensor data. NG-RAN or "NextGen RAN (Radio Area Network)" is part of the 3GPP "5G" next generation radio system. 3GPP is currently specifying Release 16 NG-RAN, its components, and interactions among the involved nodes including so-called "gNBs" (next generation Node B's or eNBs). NG-RAN will provide high-bandwidth, low-latency wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core). The NG-RAN (5G) System architecture is designed to support data connectivity and services offering with higher throughput and extremely low latency (e.g., on the order of 1 ms round trip).

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. The three tiers are coordinated through one or more dynamic Spectrum Access Systems (SAS).

Incumbent Access (existing DOD and satellite) users include authorized federal and grandfathered Fixed Satellite Service (FSS) users currently operating in the 3.5 GHz band. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels.

The FCC's three-tiered spectrum sharing architecture utilizes "fast-track" band (3550-3700 MHz) identified by PCAST and NTIA, while Tier 2 and 3 are regulated under a new Citizens Broadband Radio Service (CBRS). CBSDs (Citizens Broadband radio Service Devices—in effect, wireless access points) can only operate under authority of a centralized Spectrum Access System (SAS). Rules are optimized for small-cell use, but also accommodate point-to-point and point-to-multipoint, especially in rural areas.

Under the FCC system, the standard SAS includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. These functions are provided for by, inter alia, an incumbent detection (i.e., environmental sensing) function configured to detect use by incumbents, and an incumbent information function configured to inform the incumbent when use by another user occurs. An FCC database is also provided, such as for PAL license validation, CBSD registration, and other functions.

An optional Domain Proxy (DP) is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) can aggregate control information flows to other SAS, such as e.g., a Commercial SAS (CSAS, not shown), and generate performance reports, channel requests, heartbeats, etc.

CBSDs can generally be categorized as either Category A or Category B. Category A CBSDs have an EIRP or Equivalent Isotropic Radiated Power of 30 dBm (1 Watt)/10 MHz, fixed indoor or outdoor location (with an antenna <6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

IoT

IoT devices can use any number of lower- and higher-layer protocol stacks. Many are based on the IEEE Std. 802.15.4 WPAN MAC/PHY (including Zigbee and Thread), while others utilize BLE (Bluetooth Low Energy, also referred to colloquially as Bluetooth Smart). These technologies utilize unlicensed portions of the radio frequency spectrum (e.g., ISM bands in the U.S.) for communication, and may attempt to avoid interference or conflict with other ISM-band technologies such as Wi-Fi (IEEE Std. 802.11).

Currently, the following non-exhaustive list of exemplary technologies are available or under development for IoT applications:

Zigbee—ZigBee 3.0 is based on IEEE Std. 802.15.4, and operates at a nominal frequency of 2.4 GHz as well as 868 and 915 MHz (ISM), supports data rates on the order of 250 kbps, and has a range on the order of 10-100 meters. Zigbee radios use direct-sequence spread spectrum (DSSS) spectral access/coding, and binary phase-shift keying (BPSK) is used in the 868 and 915 MHz bands, and offset quadrature phase-shift keying (OQPSK) that transmits two bits per symbol is used for the 2.4 GHz band.

Z-Wave—Z-Wave technology is specified by the Z-Wave Alliance Standard ZAD12837 and ITU-T G.9959 (for PHY and MAC layers). It operates in the U.S. at a nominal frequency of 900 MHz (ISM), as shown in Table 4 below:

TABLE 4

| Region | Center frequency G.9959 | MHz | Data rate G.9959 | Channel Width kHz |
|---|---|---|---|---|
| United States of America | $f_{US1}$ | 916.00 | R3 | 400 |
|  | $f_{US2}$ | 908.40 | R2 | 300 |
|  |  |  | R1 | 300 |

R1—Type 1 of supported data rate - 9.6 kbps
R2—Type 2 of supported data rate - 40 kbps
R3—Type 3 of supported data rate - 100 kbps Z-Wave has a range on the order of 30 meters, and supports full mesh networks without the need for a coordinator node (as in 802.15.4). It is scalable, enabling control of up to 232 devices. Z-Wave uses a simpler protocol than some others, which can ostensibly enable faster and simpler development. Z-Wave also supports AES128 encryption and IPv6.

6LowPAN—6LowPAN (IPv6 Low-power wireless Personal Area Network) is an IP-based network protocol technology (rather than an IoT application protocol technology such as Bluetooth or ZigBee), as set forth in RFC 6282. 6LowPAN defines encapsulation and header compression mechanisms, and is not tied to any particular PHY configuration. It can also be used along with multiple communications platforms, including Ethernet, Wi-Fi, 802.15.4 and sub-1 GHz ISM. The IPv6 (Internet Protocol version 6) stack enables embedded objects or devices to have their own unique IP address, and connect to the Internet. IPv6 provides a basic transport mechanism to e.g., enable complex control systems, and to communicate with devices via a low-power wireless network.

For instance, 6LowPAN can send IPv6 packets over an IEEE 802.15.4-based network which implements "open" IP standards such TCP, UDP, HTTP, COAP, MQTT, and websockets to enable end-to-end addressable nodes, allowing a router to connect the network to IP. Moreover, mesh router devices can route data destined for other devices, while hosts are able to sleep (and hence conserve power).

Thread—Thread is a royalty-free protocol based on various standards including IEEE Std. 802.15.4 (as the air-interface protocol) and 6LoWPAN. It is intended to offer an IP-based solution for IoT applications, and is designed to interoperate with existing IEEE Std. 802.15.4-compliant wireless silicon. Thread supports mesh networking using IEEE Std. 802.15.4 radio transceivers, and can handle numerous nodes, including use of authentication and encryption.

Bluetooth Smart/BLE—Bluetooth Smart or BLE is intended to provide considerably reduced power consumption and cost while maintaining a similar communication range to that of conventional Bluetooth radios. Devices that employ Bluetooth Smart features incorporate the Bluetooth Core Specification Version 4.0 (or higher—e.g., Version 4.2 announced in late 2014) with a combined basic-data-rate and low-energy core configuration for a RF transceiver, baseband and protocol stack. Version 4.2, via its Internet Protocol Support Profile, allows Bluetooth Smart sensors to access the Internet directly via 6LoWPAN connectivity (discussed supra). This IP connectivity enables use of existing IP infrastructure to manage Bluetooth Smart "edge" devices. In 2017, the Bluetooth SIG released Mesh Profile and Mesh Model specifications, which enable using Smart for many-to-many device communications. Moreover, many mobile operating systems including iOS, Android, Windows Phone, BlackBerry, and Linux, natively support Bluetooth Smart.

The Bluetooth 4.2 Core Specification specifies a frequency of 2.4 GHz (ISM band), supports data rates on the order of 1 Mbps, utilizes GFSK (Gaussian Frequency Shift Keying) modulation, and has a typical range on the order of 50 to 150 meters. BLE uses frequency hopping (FHSS) over 37 channels (0-36 in FIG. 1a) for (bidirectional) communication, and over 3 channels for (unidirectional) advertising. The Bluetooth 4.0 link-layer MTU is 27 bytes, while 4.2 used 251 bytes. Core specification 5.0 (adopted Dec. 6, 2016) yet further extends and improves upon features of the v4.2 specification.

A BLE device can operate in four (4) different device roles, each which may cause the devices to behave differently. Two of the roles are connection-based; i.e., a peripheral device is an advertiser that is connectable and can operate as a slave as part of a two-way (bidirectional) data connection, and a central device that monitors for advertisers, and can initiate connections operating as a master for those connections. Conversely, the other two device roles are used for unidirectional communications; i.e., a broadcaster (a non-connectable advertiser which, for example, merely broadcasts data from a sensor of the IoT device, or an observer that monitors for advertisements, but cannot initiate connections (e.g., the receiver for the above-referenced broadcaster). Peripheral devices that implement a GATT Server (storage/exchange architecture) can be branded as a "Bluetooth Smart" device.

Narrowband Internet of Things (NB-IoT)—NB-IoT is a Low Power Wide Area Network (LPWAN) radio technology standard developed by 3GPP. It is intended to enable a wide range of devices and services. See 3GPP Release 13 (LTE Advanced Pro), June 2016. NB-IoT focuses specifically on indoor coverage, low cost, long battery life, and high connection density. NB-IoT uses a subset of the LTE-A standard technology, but restricts bandwidth to a single narrow-band of 200 kHz. OFDM modulation is specified for the downlink, and SC-FDMA is specified for the uplink.

Other IoT technologies which may be used consistent with the present disclosure for certain functions such as e.g., IoT sensor data transmission include LTE-M (i.e., eMTC (enhanced Machine-Type Communication) and LC-LTE/MTCe (aka LTE Cat 0; Release 12)), and EC-GSM-IoT (Release 13).

Longer Range IoT

Extant technologies adapted for intermediate range WAN (e.g., somewhere between cellular and WLAN) IoT functionality applications include Sigfox, Neul, and the previously described LoRaWAN. These are typically employed for much longer distances than the comparatively short-range PAN solutions described above.

In LoRa, communication between the aforementioned end-devices and gateways is distributed on different frequency channels and data rates, and used "chirped FM" spread spectrum modulation operating in the 915 MHz ISM band. The selection of the data rate is a trade-off between communication range and message duration. Due to the spread spectrum nature of LoRaWAN technology, communications with different data rates do not interfere with each other via creation of "virtual" channels. LoRaWAN data rates range from 0.3 kbps to 50 kbps. The LoRaWAN network server is configured to manage the data rate and RF output for each end-device individually by means of an adaptive data rate (ADR) scheme, so as to, inter alia, optimize battery life/power consumption. LoRaWAN security is based on that under IEEE 802.15.4 standards, including AES 128 bit encryption.

Device addresses (DevAddr) in LoRaWAN are structured as a 32-bit identifier and are unique within the network, and are also present in each data frame. DevAddr's are shared between end-devices, network servers, and applications servers.

LoRa ranges may be on the order of 10-15 km depending on propagation paths, interference from other sources, etc.

Various end-device classes have different behavior depending on the choice of optimization; i.e., Battery Powered (Class A); Low Latency (Class B); and No Latency (Class C). It will be appreciated that while not required by various embodiments described herein, various devices used within the architecture may be selected based on Class for particular applications. For instance, use of low-latency (Class C) devices may be useful in real-time applications such as the network-based VR/AR embodiments described herein.

C-Band

The C band is a designation by IEEE for a portion of the electromagnetic spectrum in the microwave range of frequencies ranging from 4.0 to 8.0 gigahertz (GHz). The C band (4 to 8 GHz) is used for many satellite communications transmissions, some Wi-Fi devices, some cordless telephones as well as some surveillance and weather radar systems.

The communications C band is allocated for, inter alia, commercial telecommunications via satellites and terrestrial microwave radio relay chains. The microwave frequencies of the C band perform better under adverse weather conditions in comparison with, for instance the Ku band (11.2 GHz to 14.5 GHz), microwave frequencies used by some communication satellites.

The C band also includes the 5.8 GHz ISM band between 5.725-5.875 GHz, which is used for medical and industrial heating applications and many unlicensed short range microwave communication systems, such as cordless phones and vehicle keyless entry systems. The C-band frequencies of 5.15 to 5.35 GHz, 5.47 to 5.725 GHz, or 5.725 to 5.875 GHz, depending on the region of the world, are also increasingly used for IEEE 802.11a Wi-FiWLAN applications.

IEEE 802.11ac/ad

IEEE 802.11ac (aka "Wi-Fi 5") is a wireless networking standard in the Wi-Fi standards, and provides high-throughput wireless local area networks (WLANs) on the 5 GHz band.

The standard specifies multi-station throughput of at least 1 gigabit per second and single-link throughput of at least 500 megabits per second (500 Mbit/s). This is accomplished by, inter alia, use of wider RF bandwidth (up to 160 MHz), more MIMO spatial streams (up to eight), downlink multi-user MIMO (up to four clients), and high-density modulation (up to 256-QAM). So-called "Wave 2" certification, which include additional features like MU-MIMO, 160 MHz channel width support, support for more 5 GHz channels, and four spatial streams translates to products which have higher bandwidth and capacity than earlier (Wave 1) 802.11ac products.

IEEE 802.11ad is an amendment to the IEEE 802.11 wireless networking standard, and was developed to provide a Multiple Gigabit Wireless System (MGWS) using a 60 GHz frequency. It is a networking standard used for e.g., so-called "WiGig" networks. Because it uses the V band of millimeter wave (mmW) frequency, the range of IEEE 802.11ad communication is more limited as compared to other conventional Wi-Fi systems. However, the high frequency (60 GHz) allows for greater bandwidth which in turn enables the transmission of data at high data rates; up to multiple gigabits per second. As such, usage scenarios such as transmission of uncompressed UHD video over the wireless network may be readily supported.

In one embodiment, the edge/cloud AAP 134 is configured to communicate with the gateway 102 (via e.g., installed application or other code operative on each) to both transact sensor data and user commends/input between the entities, and enable control of gateway 102 by the AAP 134 (or another entity acting as its proxy). For instance, in one variant, the AAP may determine that operation of the gateway with respect to certain sensors is non-optimized, and hence request a configuration change; e.g., switch to another air interface or modem, utilize a different frequency band, change MCS for a given interface, employ more or less spatial diversity (e.g., MIMO), change TDMA slots, or any other number of configuration modifications which may enhance sensor-to-gateway (or sensor proxy-to-gateway) connectivity. As another example, the AAP may instruct the gateway 102 to prioritize certain sensor data (or classes of data) over others, such as when bandwidth is restricted, or video QoS requirements are imposed (e.g., from a UHD camera feed where the user deems it critical to obtain clear video imagery). It may also invoke reboot of the gateway (or individual modules thereof), cause the gateway to invoke data requests from certain sensors or their associated access node, cause waking of sleeping nodes/sensors, etc.

System Architecture—

FIG. 1 is a high-level graphical representation of a system architecture 100 and the various components thereof according to one embodiment of the present disclosure. In this embodiment, a gateway 102 aggregates sensor data from e.g., NB-IoT sensors, IoT sensors, and other wireless enabled sensors. The gateway 102 may utilize LoRa, Wi-Fi, 5G NR, C-band, mmWave such as 60 GHz, CBRS, or other means to retrieve data from target (monitored) locations. For instance, a WLAN AP may be used to communicate with STAs (sensors acting as "minions" to the AP), and the AP may be backhauled by a longer-range wireless technology such as CBRS, LoRa, etc.

Target locations may comprise literally any location (indoor or out, depending on the technology utilized). See e.g., the discussion of FIG. 1A below, wherein target locations include fields, barns, bins, silos, hog houses, hen houses, other animal housings, sensors coupled to animals, water meters, electric meters, and the like.

In one embodiment, target locations comprise various areas (e.g., Area 1 (110), Area 2 (112)), 8K 360-degree cameras (108), security cameras (106), process machinery (118), Function 1 (114), Function 2 (116), and servers, databases or repositories (120). At each target location sensors are placed in various areas within or around the target to collect, measure, and otherwise sense desired data. Portions of the sensors may in any given target area or areas may be connected via a wired connection to reduce the need for multiple wireless nodes. For example, the servers or data repositories 120 may include seven different devices (e.g., server farms) and each may have four temperature sensors wherein all twenty-eight sensors meet at a single wireless node to reduce the need for multiple wireless nodes and reduce the cost of IoT connectivity. Alternatively, each IoT sensor may have its own wireless node, or they may be logically aggregated.

As discussed in greater detail below with respect to FIGS. 2 and 3, sensor data is aggregated from the target areas via the gateway 102 and sent to the IoT aggregation and analytics platform (AAP) 134 which may be located on a service provider server, cloud service, or other networked storage device. An application 136 receives the sensor data from the IoT platform 134 and displays the sensor data via e.g., a VR headset 132, tablet 130, mobile device or UE 128, computer 126, or other UI and display means. The AAP in one embodiment collects all performance, system configuration information, and usage data, and enables the identification of operational status, the usage behavior, and consequently the actions that need to be performed by the user. In further embodiments, the foregoing actions can be automated to enhance efficiencies, including via AI or ML algorithms.

In one variant (see discussion of the exemplary embodiment of FIGS. 1a and 7a-7k herein), the application 136 displays the sensor data overlaid onto 360-degree 8K video. In another variant, the application 136 displays the sensor data overlaid onto 3D video. A user interface in a virtual environment is implemented to view and change settings to a desired degree. In one embodiment artificial intelligence and machine learning may automatically suggest actions to the user or change settings. In another implementation, the application 136 displays the sensor data on a webpage for a user to review and or change settings.

In one embodiment, the VR application is based on the Unity (VR) development environment (see e.g., https://docs.unity3d.com/Manual/UnityManual.html, incorporated herein by reference in its entirety). The VR application in one implementation runs on Windows-based local server machine (see FIG. 2A). The VR headset is wirelessly connected to the VR server via e.g., mmWave link so that latency is not an issue. For instance, in one variant, the Qualcomm "Boundless XR for PC" system utilizing a Snapdragon 845 processor combined with a wireless 802.11ad IC allow high-bandwidth 60 GHz connection between the local VR server and a stand-alone VR headset (e.g., Oculus Rift or Quest) is utilized as the basis for the VR server and headset.

However, in other embodiments, the VR server is disposed within a cloud entity (e.g., local node, headend, or MEC) with the 5G NR low-latency backhaul sufficient to maintain good user experience for the user of the headset at the site (i.e., the headset uses a wireless link to a gateway which forwards and receives VR-related data to/from the network-based VR server). The processed IoT data is pulled from the IoT processing center through a secure API over the internet to be displayed on the VR background. This is done on the order of every several seconds (5-10) so any airlink network latency is not really an issue. In one variant, the IoT processing center pushes high priority notifications to the user applications so that high-frequency data pulling not be required. So in this case the "normal" IoT data (e.g. temperature, humidity) would be pushed and/or pulled every few minutes (5-10 or so) and any high priority events (e.g. door alarm) would be pushed as it occurred. Low latency IoT behavior is not required to support the VR application.

It will also be appreciated that the methods and apparatus described in co-owned and co-pending U.S. patent application Ser. No. 16/654,662 filed Oct. 16, 2019 and entitled "APPARATUS AND METHODS FOR ENHANCED CONTENT CONTROL, CONSUMPTION AND DELIVERY IN A CONTENT DISTRIBUTION NETWORK," incorporated herein by reference in its entirety, may be used consistent with the architecture of the present disclosure. For instance, in one such implementation, user hand or other gestures may be captured and analyzed (whether locally at the served premises, or within an MEC process (micro edge cloud) and utilized in modifying the content of one or more video or audio streams delivered to the monitoring user (e.g., at the site). For instance, a user at the premises making use of the VR/AR headset may, via hand gesture which is recognized by local recognition apparatus, cause changes to the video feeds he/she is receiving via the VR/AR system, such as substituting one feed for another, creating aggregated feeds (including those with externally sourced content such as one from a remote location such as another farm), etc. Use of 5G NR technology for at least the captured gesture data or imagery enables ultra-low latency and therefore makes the gesture control highly intuitive and temporally reactive, and avoids user-perceptible latency and "jerkiness." Each user may also "train" the system for user-specific gesture commands which are intuitive to them personally, adapted to their personal physiology/handicaps, etc.

As shown in FIG. 1, a drone 122 may be deployed to stream video back to the application 136 for viewing by a user at the VR headset 132, tablet 130, mobile device 128, or laptop 126. The drone link 124 (e.g., wireless link such as via NB-IoT, cellular modem, or even FDMA or other direct access in an unlicensed band such as 2.4 GHz or 5.8 GHz such as the CONNEX wireless solution offered by Amimom Corporation) may facilitate real-time access to sensors and control of said sensors. Deployment of one or more drones 122 may in some cases save resources and allows for remote access of target locations where sensors are located. Note that the present disclosure contemplates remote control of the drone(s) 122 via the UI of the user platform.

In one embodiment, a web server (such as the AAP 134 of FIG. 1) may communicate with an IoT proxy (hub or gateway 102), such as to "pull" data from, or "push" data to, the IoT end-devices. For instance, in one model, the hub periodically polls or receives data from the IoT devices, and then reports this aggregated data to the web server via a push/pull mechanism. In one variant, the hub/gateway has an outward-facing API (application programming interface) whereby the web server or other process can implement the API function (e.g., a data "GET"). However, such API functionality (and hub access in general) is typically highly restricted, primarily for security and privacy reasons.

One of the most powerful aspects of the "Internet of Things" from an architectural perspective is in fact ubiquitous connectivity; the ability for example of a user's refrigerator to interface with local or remote entities to enhance its performance, save the owner money on electric bills, diagnose/troubleshoot itself, and any other of numerous possible use cases, all militate in favor of high levels of connectivity. Such is also true of adapting products and/or services to particular user traits or habits; for instance, targeted service or advertising provision can be effectively based on user-specific habits or traits (e.g., a person who frequently uses their microwave oven may lean toward microwave-able food items, and may benefit from advertising relating thereto). Herein lies a salient advantage of utilization of IoT/highly connected devices in the present context; i.e., that by amassing significant amounts of sensor data over time from a broad array of different types of sensors, and from different monitored sites (e.g., MSO customers or subscribers), the AAP 134 may both identify patterns or specific attributes behaviors on a per-customer basis, as well as across multiple different customers. In one such aspect, the AAP 134 of a network operator is placed in communication with a given customer site after installation of the gateway, sensors, etc. at the site, and in effect "learns" the patterns, data types, issues, etc. associated with that particular site (and that particular type or class of site; e.g., farm, university, enterprise, etc.) through machine learning (ML) and AI algorithms resident on the AAP. As such, this learned behavior can also be applied to both subsequent operations of the same site, and other similarly situated sites. In one variant, the AAP is configured to build site "templates" which contain rules and relevant data for various types of sensor, operations, classes of machinery (e.g., irrigation equipment watering schedules for certain types of crops at certain environmental/weather conditions or times of year).

In one embodiment, the machine learning (ML) algorithms are configured to evaluate parameters relating to the monitored site; e.g., the trended behavior by each seasonal activity of the exemplary farm. This necessitates a series of learning cycles that can be implemented externally (i.e., on a network-based system, or cloud computation system such as Google Cloud for Deep Learning) based on (i) data relating to the operation of one or more typical farms, including those of the same or similar type, geographic proximity, etc.; and/or (ii) by allowing the machine learning engine/algorithms to learn over the years on the usage patterns for the same site. Once the learning cycle is complete (or as it continues to be updated over time with data from one or both of (i) and (ii) above), the usage patterns of every single element in the farm's operation can be base-lined, and deviations and corrective actions can be identified in the ML database. In one implementation, once the corrective actions are implemented at the monitored site, automation of the corrective action is used to verify that in fact the desired correction is actually occurring (e.g. if the temperature in a grain silo is identified to be unnecessarily low during the storage time, then the fan/heater could be turned on to regulate the temperature to maintain the optimal temperature in the silo to maintain the ideal yield as 'learned' by the ML system).

Service Provider Network—

Referring now to FIGS. 2-4d, exemplary embodiments of monitored facility (premises) and service provider networks are described in detail.

Figure 2:
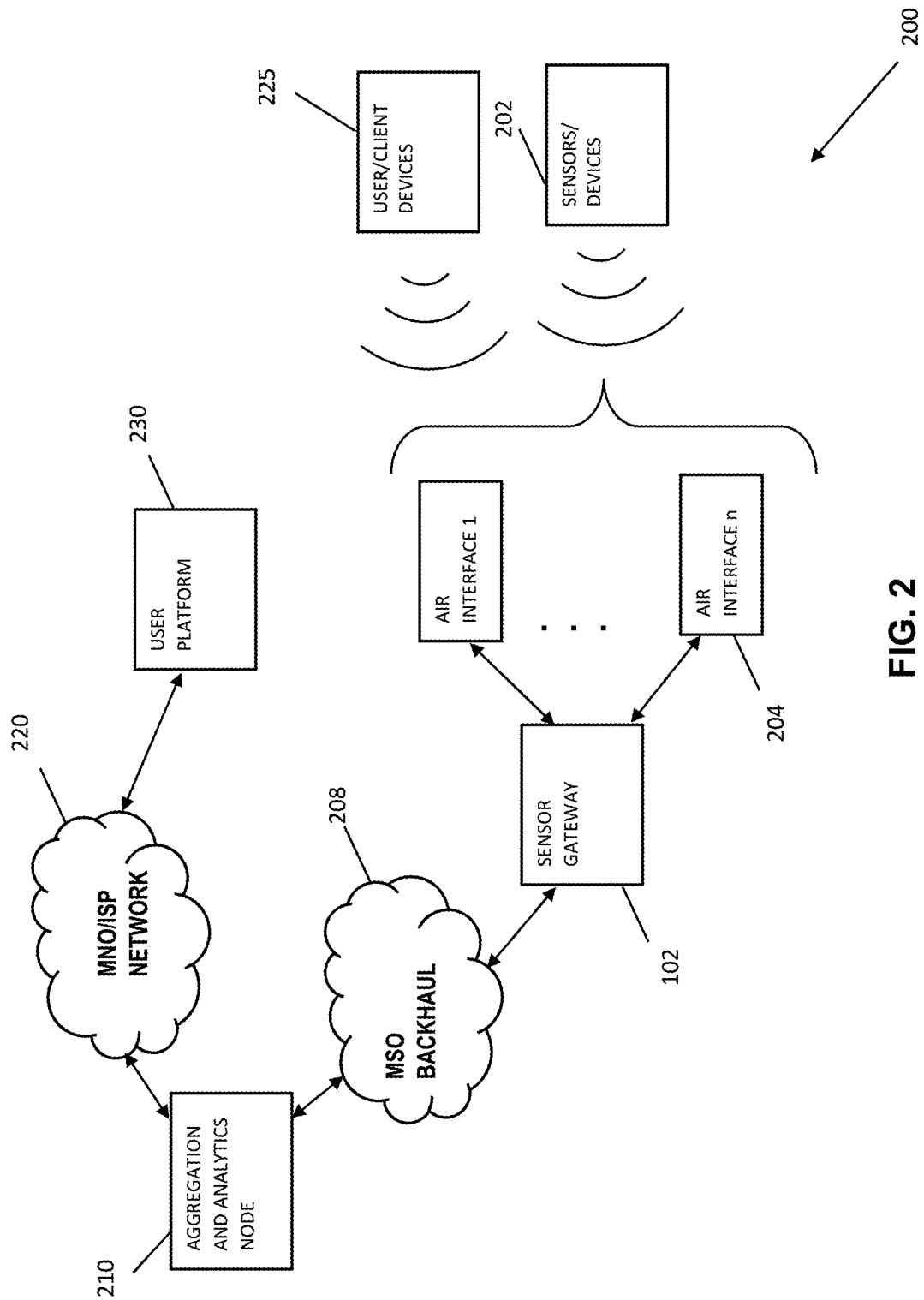
FIG. 2 is a functional block diagram showing the various sensor and network components of the architecture of FIG. 1.

FIG. 2 is a functional block diagram showing the various sensor and network components of the architecture of FIG. 1. As shown, the architecture 200 includes a sensor gateway 102 in operative wireless communication with a plurality of sensor devices 202 and one or more user/client devices 225 via respective air interfaces 204. The air interfaces are selected based on their attributes relative to the intended applications (e.g., LoRa for longer distance IoT sensors, Wi-Fi for user devices, mmWave (e.g., 60 GHz via e.g., Wi-Fi 802.11 ad for direct LOS higher-bandwidth applications, etc.). The sensor gateway 102 is backhauled by an MSO backhaul 208 (such as the 5G NR CBRS-based wireless approach described elsewhere herein which is optimized for rural use cases) such that the AAP node 210 can obtain the sensor data, including in some embodiments with ultra-low latency. A remote user can also access site-related data via a user platform (e.g., mobile device or PC) via their MNO or ISP network 220, with the AAP node 210 acting as a server for the client device (the latter including an application program operative to execute thereon to enable generation of UI data relating to the monitored site, similar to that returned to the MR headset in certain embodiments described herein).

FIG. 2A is a functional block diagram showing one implementation of the architecture of FIG. 2, including 3GPP 5G NR backhaul using CBRS spectrum. In this implementation, the architecture 250 includes a LoRa sensor gateway 254 of the type previously described, which backhauls each of the LoRa interfaces (which may be aggregated) and their corresponding sensor devices 202 to a LAN 251 at the premises. The premises LAN includes a router 253 and associated PC or other workstation, and is coupled to e.g., a WLAN extender 255 which enables obtaining video data from disparate portions of the facility via e.g., a video gateway. Also part of the LAN is the (local) VR/AR server 252 which in one embodiment utilizes a wireless link with its user via e.g., mmWave or other short-range, high bandwidth technology. As previously discussed, the local VR/AR server may also be in logical communication with the network-based AR/VR application system 271 (via the FWA 256 and associated 5G backhaul 208 from the site to the MSO CBSD 258, the latter which may be backhauled to the MSO core and/or edge via fiber or DOCSIS). Remote LoRa server/desktop functions 273 and the IoT application system 272 disposed at e.g., an MSO network node or edge are also logically communicative with the site; i.e., the LoRA sensor gateway, and the Remote LoRa server also communicates with the IoT application system 272. The VR and AR systems 271, 252 then obtain the processed IoT data from the IoT data processing system 272.

Exemplary embodiments of the disclosure also enable s-called "desktop as a service" (DAAS) which uses centralized shared hardware resources to provide high performance computing capabilities to remote "thin" client devices. Exemplary implementations of DAAS requires a moderate amount (~4 Mbps) of bandwidth to provide a good user experience. The remote client platform can be a low cost device (e.g. Raspberry Pi).

Figure 3:
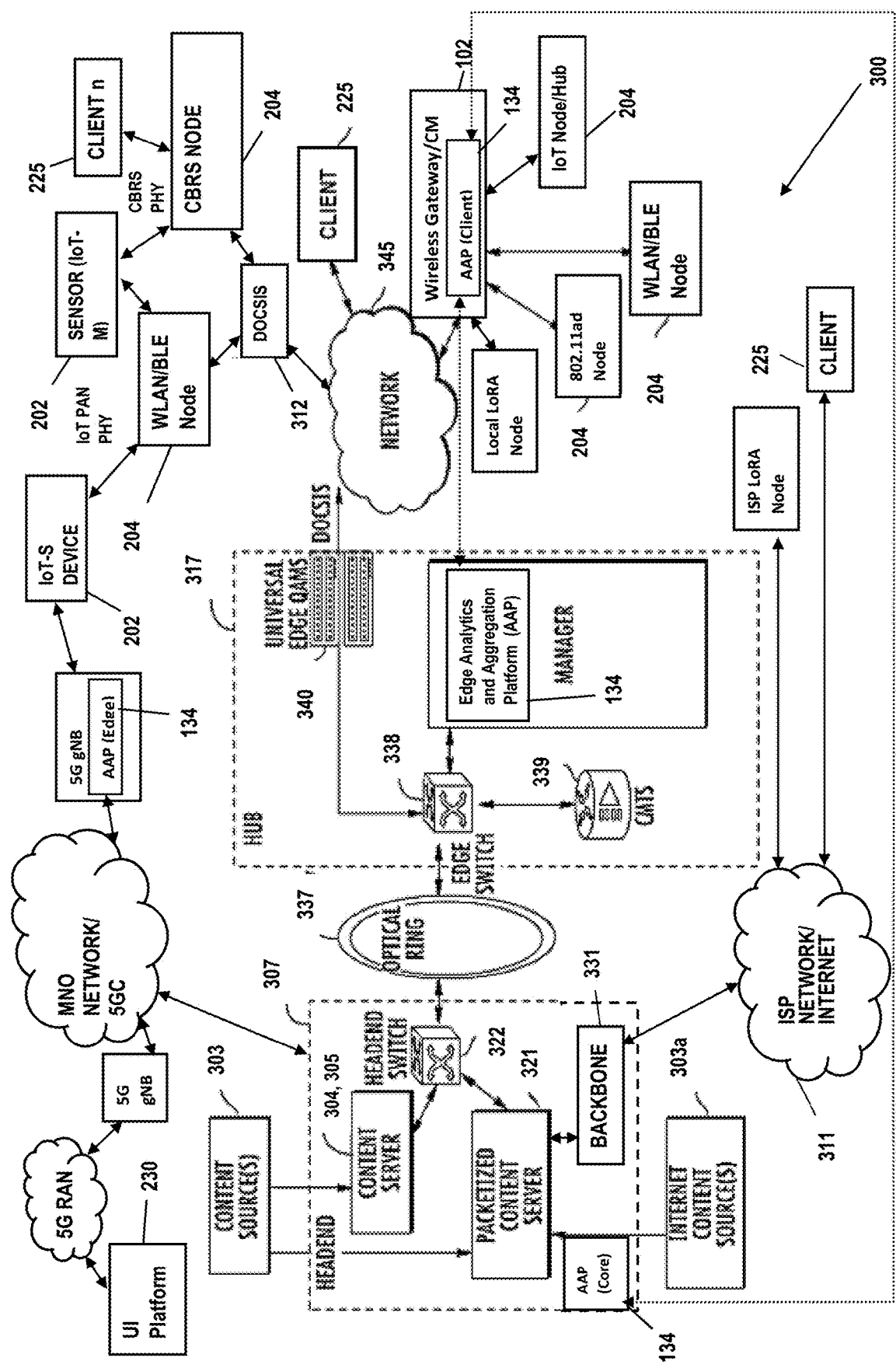
FIG. 3 is a functional block diagram illustrating an exemplary embodiment of the architecture of FIG. 2 implemented as part of a hybrid fiber network.

FIG. 3 illustrates a typical service (e.g., cable MSO) provider network configuration adapted for use with the features of the integrated sensor environment described herein. This service provider network 300 is used in one embodiment of the disclosure to provide backbone and Internet access from the service provider's wireless access nodes (e.g., LoRa nodes, CBSDs, 5G NR gNBs (e.g., NR-U), IoT access nodes or hubs, Wi-Fi APs or base stations 204 operated or maintained by the service provider or its customers/subscribers), one or more stand-alone or embedded cable modems (CMs) 312 in data communication therewith, or even third party access points accessible to the service provider via, e.g., an interposed network such as the Internet 311 (e.g., with appropriate permissions from the access node owner/operator/user).

As described in greater detail subsequently herein with respect to FIGS. 4a-4d, one or more AAP entities 134 are utilized for, inter alia, aggregation of sensor data, transmission of streaming media, analytics and machine learning (ML)/AI, and control of the wireless network access nodes and gateway 102 at least partly by the MSO. As opposed to an unmanaged network, the managed service-provider network 300 of FIG. 3 advantageously allows, inter alia, control and management of a given user's and/or IoT device's access (such user which may be a network subscriber, or merely an incidental/opportunistic user of the service, such as a subscriber of a "partner" MNO) via the wireless access node(s) 204, including imposition and/or reconfiguration of various access "rules" or other configurations applied to the wireless access nodes. For example, the service provider network 300 allows components at or within range of an area, premises or site of interest (e.g., CBSDs, IoT access nodes, Wi-Fi APs, 5G NR-U gNBs, LoRa nodes, and any supporting infrastructure such as routers, switches, etc.) to be remotely reconfigured by the network MSO, based on e.g., prevailing operational conditions in the network, changes in user population and/or makeup of users or IoT devices at the service location or site, business models (e.g., to maximize profitability or provide other benefits such as enhanced user experience, as described infra), spectrum channel changes or withdrawals (e.g., by CBRS SAS), provide IoT connectivity and/or "backhaul," or even simply to enhance user experience using one RAT (e.g., LoRa or CBRS) when another RAT (e.g., WLAN or IoT native PAN is sub-optimal for whatever reason).

In certain embodiments, the service provider network 300 also advantageously permits the aggregation and/or analysis of IoT device-, subscriber-, or account-specific data (including inter alia, particular mobile or IoT devices associated with such subscriber or accounts) as part of the provision of services to users under the exemplary service models described herein. As but one example, device-specific IDs (e.g., MAC address or the like) can be cross-correlated to MSO subscriber data maintained at e.g., the network head end(s) 307 so as to permit or at least facilitate, among other things, (i) user or IoT device authentication; (ii) correlation of aspects of the site to particular subscriber demographics, such as for delivery of targeted services or advertising; and (iii) determination of subscription level, and hence device or subscriber privileges and access to features or functions. Moreover, device profiles for particular user or IoT devices (e.g., the UI platform 230) can be maintained by the MSO, such that the MSO (or its automated proxy processes) can model the user or IoT device for wireless capabilities.

The wireless access nodes 204 disposed at the service location(s) (e.g., areas, premises, or venue(s) of interest) can be coupled to the bearer managed network 300 (FIG. 3a) via, e.g., a cable modem termination system (CMTS) and associated local DOCSIS cable modem (CM) 312, a wireless bearer medium (e.g., an CBRS, 802.16 WiMAX or millimeter wave system), a fiber-based system such as FiOS or similar, a third-party medium which the managed network operator has access to (which may include any of the foregoing), or yet other means. Notably, through aggregation of the various wireless technologies at the site via a gateway 102 (see FIGS. 2 and 3), the need for backhaul can be condensed into a single or limited number of technologies (whether wireline or wireless), and is adaptable to the specifics of the given site (e.g., whether or not there is an extant cable or fiber drop, whether cellular/data coverage by an MNO such as Verizon or AT&T exists, etc.).

The various components of the exemplary embodiment of the network 300 generally include (i) one or more data and application origination sources 302; (ii) one or more content sources 303, (iii) one or more application distribution servers 304; (iv) one or more on-demand (VOD) servers 305, (v) client devices 225, (vi) IoT devices 202, (vii) one or more routers 308, (viii) one or more AAP entities 134 (may be placed more locally such as in the CMTS infrastructure, 5G gNB components, and/or as shown or in the headend or "core" portion of network), (ix) one or more cable modems 312, and/or (x) one or more access nodes or hubs 204. A simple architecture comprising one of each of certain components 302, 303, 304, 305, 308, 309, 310 is shown in FIG. 3 for simplicity, although it will be recognized that comparable architectures with multiple origination sources, distribution servers, AAA servers, AP controllers, AAPs, and/or client or IoT devices (as well as different network topologies) may be utilized consistent with the present disclosure.

The system of FIG. 3 may deliver Internet data and OTT (over-the-top) services to the end users (including those of the access nodes or hubs 204) via the Internet protocol (IP) and TCP, although other protocols and transport mechanisms of the type well known in the digital communication art may be substituted, and also may receive data (e.g., streaming video) from the monitored site for delivery to e.g., the UI platform 230 via the MNO service provider network 220 (FIG. 2).

The network architecture 300 of FIG. 3 generally comprises one or more headends 307 in communication with at least one hub 317 via an optical ring 337. The distribution hub 317 is able to provide content to various user/client devices, and gateway devices as applicable, via an interposed network infrastructure 345.

The network architecture 300 of FIG. 3 may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC or H.265/HEVC) may be delivered to user IP-based client devices over the relevant physical transport (e.g., DOCSIS channels or 5G NR channels to the monitored site); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOC SIS QAMs or 5G NR bearers to the user's PC or other IP-enabled device via the user's cable modem 312 (including to end users of the access node 314). Delivery in such packetized modes may be unicast, multicast, or broadcast.

Individual client devices such as cable modems 312, gateway 102 and associated end-user devices of the implementation of FIG. 3 may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one implementation, the CM 312 shown in FIG. 3 services a premises, such as a large structure (e.g., farm site, or office building or hotel), which includes a CBRS node 204 for CBRS-band (3.55-3.7 GHz) access, a 5G NR-U gNB (not shown), and an IoT node or hub for IoT "native" access (e.g., within the designated ISM or other band(s) used by the IoT device(s) 202). The illustrated IoT devices may include a multi-band/RAT IoT device (IoT-M) (e.g., one with IoT PAN RAT and also CBRS capability), and a single-RAT IoT device (IoT-S), having only its indigenous IoT interface (e.g., 802.15.4-based, Z-Wave, or BLE), or alternatively, a single interface configured (or configurable, such as via a software defined radio (SDR) of the device) for communication via the CBRS band(s).

In another variant, the utilized spectrum comprises a frequency range between 2.300 to 2.400 GHz band consistent with LSA technology.

In yet another variant, the utilized wireless spectrum comprises a frequency range between 570 MHz to 790 MHz band consistent with ETSI "White Spaces Devices."

Notably, the client devices 225 and IoT-M devices communicating with the access nodes 204, as described in greater detail subsequently herein, can utilize either RAT (e.g., CBRS, NR-U, WLAN, or IoT native) depending on, inter alia, directives received from the MSO AAP controller 134 via one access node or the other, or even indigenous logic on the client or IoT device 202 enabling it to selectively access one RAT or the other. Both RATs can operate in tandem when utilizing different frequencies, modulation techniques, interference mitigation techniques, and/or Tx power.

In parallel with (or in place of) the foregoing delivery mechanisms, the MSO backbone 331 and other network components can be used to transact packetized content to the user's mobile client device 225 via non-MSO networks. The ISP may also support a longer range LoRa node as shown; e.g., for transmission from highly rural areas where no cable drop or other wireless coverage exists.

The architecture of FIG. 3 also includes an MNO network which may be used consistent with the various aspects of the present disclosure. As shown, the MNO network may provide mobile wireless (e.g., cellular data, via 5G NR gNB operated by the MNO) service to the UI platform 230, as well as supporting operation of one or more gNBs (which may include "edge" AAP entities 134 as discussed in greater detail with respect to FIGS. 4a-4d below) in support of the analytics and processing and monitoring functions at the MSO customer site. In this regard, the MSO and one or more MNOs (and/or ISPs) may cooperate to establish the necessary low-latency high bandwidth links "end to end" from the site sensors 202 and gateway 102 to the UI platform 230, such as via cooperative agreements. Moreover, the MNo and MSO may cooperate on establishment of one or more 5G NR network slice, such as to e.g., allocate one or more dedicated channels or bearers (and other interposed infrastructure) to meet latency requirements.

Placement of the AAP at the edge (such as in a gNB or other peripheral node such as a CBSD) may also be used to in some cases reduce latency, in that the collected and aggregated sensor data and video data need not be backhauled to the 5GC (or MSO core), but rather may be routed directly to the UI platform 230 from the "edge" AAP via 5G infrastructure such as an UPF or packet gateway.

It will also be appreciated that the methods and apparatus described in U.S. patent application Ser. No. 16/384,805 filed Apr. 15, 2019 entitled "GATEWAY APPARATUS AND METHODS FOR WIRELESS IoT (INTERNET OF THINGS) SERVICES," and issued as U.S. Pat. No. 11,190, 861 on Nov. 30, 2021, incorporated herein by reference in its entirety, may be used consistent with the architecture 300 of the present disclosure. As described therein, the MSO HFC network can be utilized as a 5G NR bearer through utilization of expanded frequency bandwidth (e.g., up to 1.6 GHz) and waveforms consistent with 5G NR, as well as complementary CPE for receipt and distribution of the 5G NR waveforms (including for IoT function support, such as NB-IoT).

Moreover, IoT premises devices such as that described in co-owned U.S. patent application Ser. No. 15/821,218 filed Nov. 22, 2017 entitled "APPARATUS AND METHODS FOR PREMISES DEVICE EXISTENCE AND CAPABILITY DETERMINATION," and issued as U.S. Pat. No. 10,966,073 on Mar. 30, 2021, incorporated herein by reference in its entirety, may be used consistent with the present disclosure. For instance, an IoT "sniffer" device may be used in conjunction with other monitored site infrastructure in order to canvass and establish the presence of the various IoT sensors and air interfaces which may be indigenous to the site prior to or concurrent with installation of the site monitoring apparatus. Such sniffer may also be part of the gateway 102 described herein, or may also be embodied as portable handheld wireless-connected devices which may be used by installers.

Distributed gNB Architectures

Figure 4A:
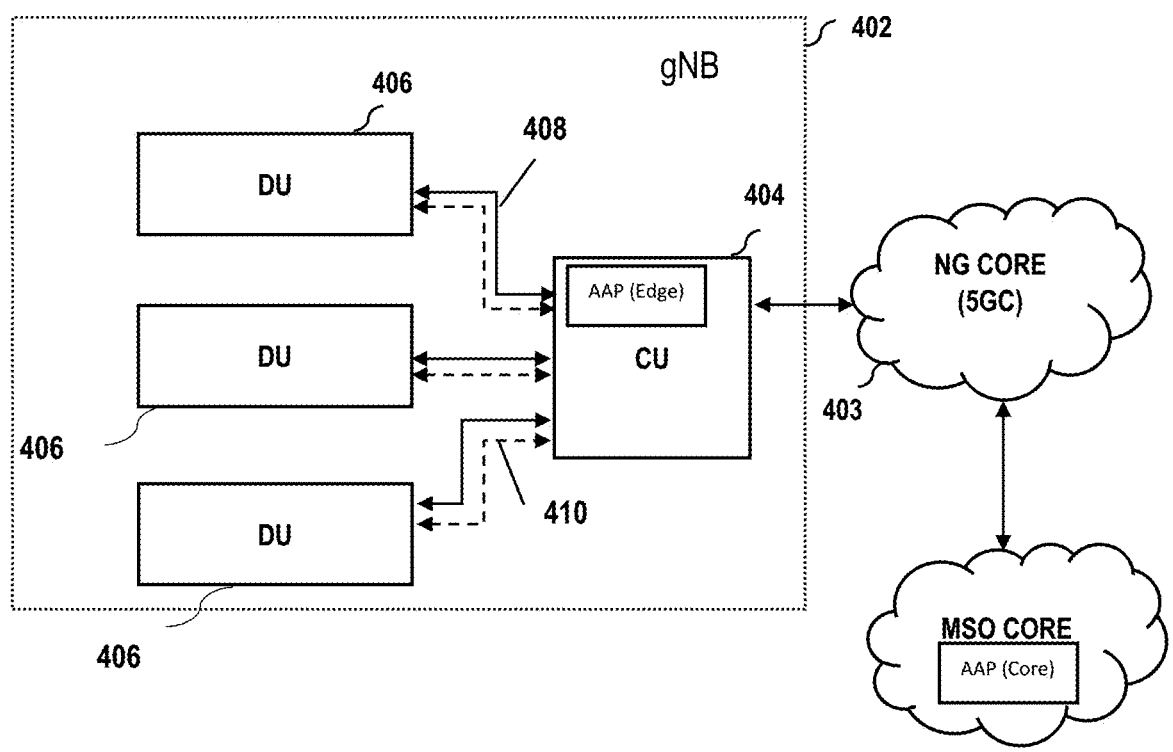
FIG. 4a is a functional block diagram of one exemplary embodiment of a gNB architecture including CU and multiple DUs and AAP entities at the CU and the MSO core, according to the present disclosure.

Referring now to FIGS. 4a-4d, various embodiments of the distributed (CU/DU) gNB architecture according to the present disclosure are described. As shown in FIG. 4a, a first architecture includes a gNB 402 having a CU 404 and a plurality of DUs 406. As referenced above, an AAP 134 may included within the CU logic In order to support "edge" site monitoring and control functions as described herein. The gNB may utilize licensed or unlicensed (e.g., NR-U) spectrum, and may be owned/operated by the MNO, MSO, or any combination thereof.

The individual DU's 406 in FIG. 4a communicate data and messaging with the CU 404 via interposed physical communication interfaces 408 and logical interfaces 410. As previously described, such interfaces may include a user plane and control plane, and be embodied in prescribed protocols such as F1AP. It will be noted that in this embodiment, one CU 404 is associated with one or more DU's 406, yet a given DU is only associated with a single CU. Likewise, the single CU 404 is communicative with a single NG Core 403, such as that operated by an MNO or MSO, but may also be communicative with an MSO core (and "core" AAP entity thereof). Each NG Core 403 may have multiple gNBs 402 associated therewith.

Figure 4B:
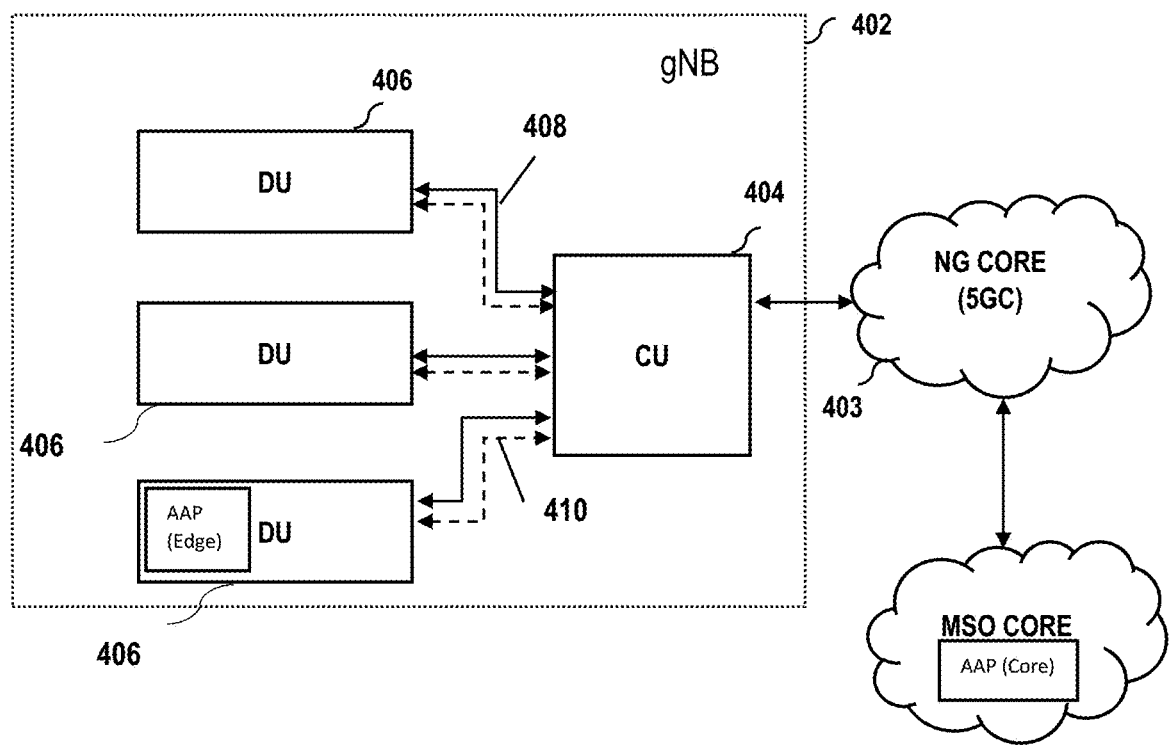
FIG. 4b is a functional block diagram of another exemplary embodiment of a gNB architecture including CU and multiple DUs and AAP entities at the DU and MSO core, according to the present disclosure.

In the architecture of FIG. 4b, the edge AAP 134 is disposed within a DU, such as one which may be local to a rural site to be monitored. In this fashion, the MSO or MNO can provision individual DU elements of a given gNB specific to the needs of the area served; one DU may serve no sites (and hence not require an AAP), while another DU of the same gNB may serve such sites, and have the AAP operative thereon.

Figure 4C:
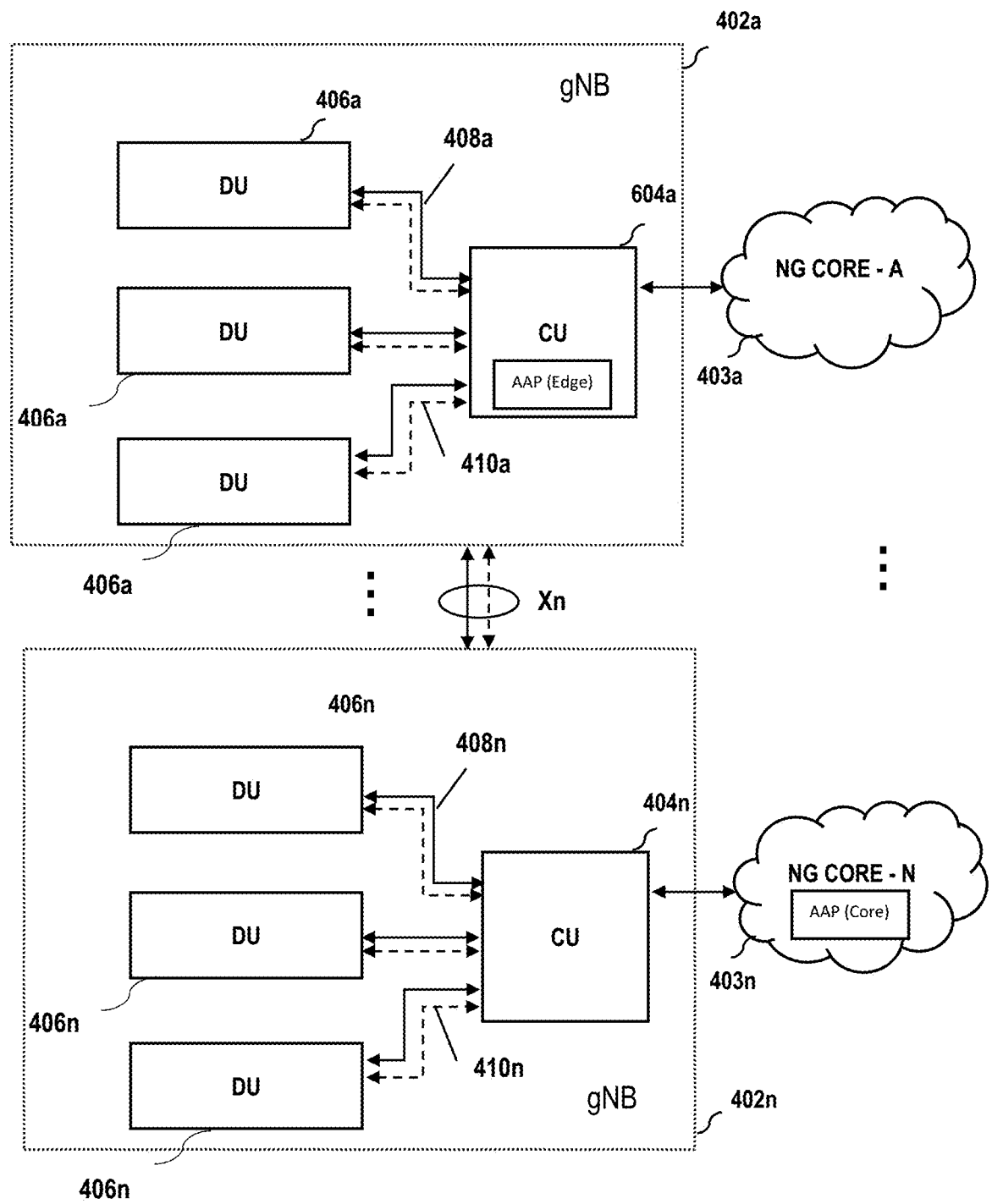
FIG. 4c is a functional block diagram of another exemplary embodiment of a gNB architecture including multiple CUs cross-connected (via Xn) and multiple corresponding DUs and 5GCs, according to the present disclosure.

In the architecture of FIG. 4c, two or more gNBs 402a-n are communicative with one another via e.g., an Xn interface 407, and accordingly can conduct at least CUe to CUe data transfer and communication. Separate NG Cores 403a-n are used for control and user plane (and other) functions of the network.

Figure 4D:
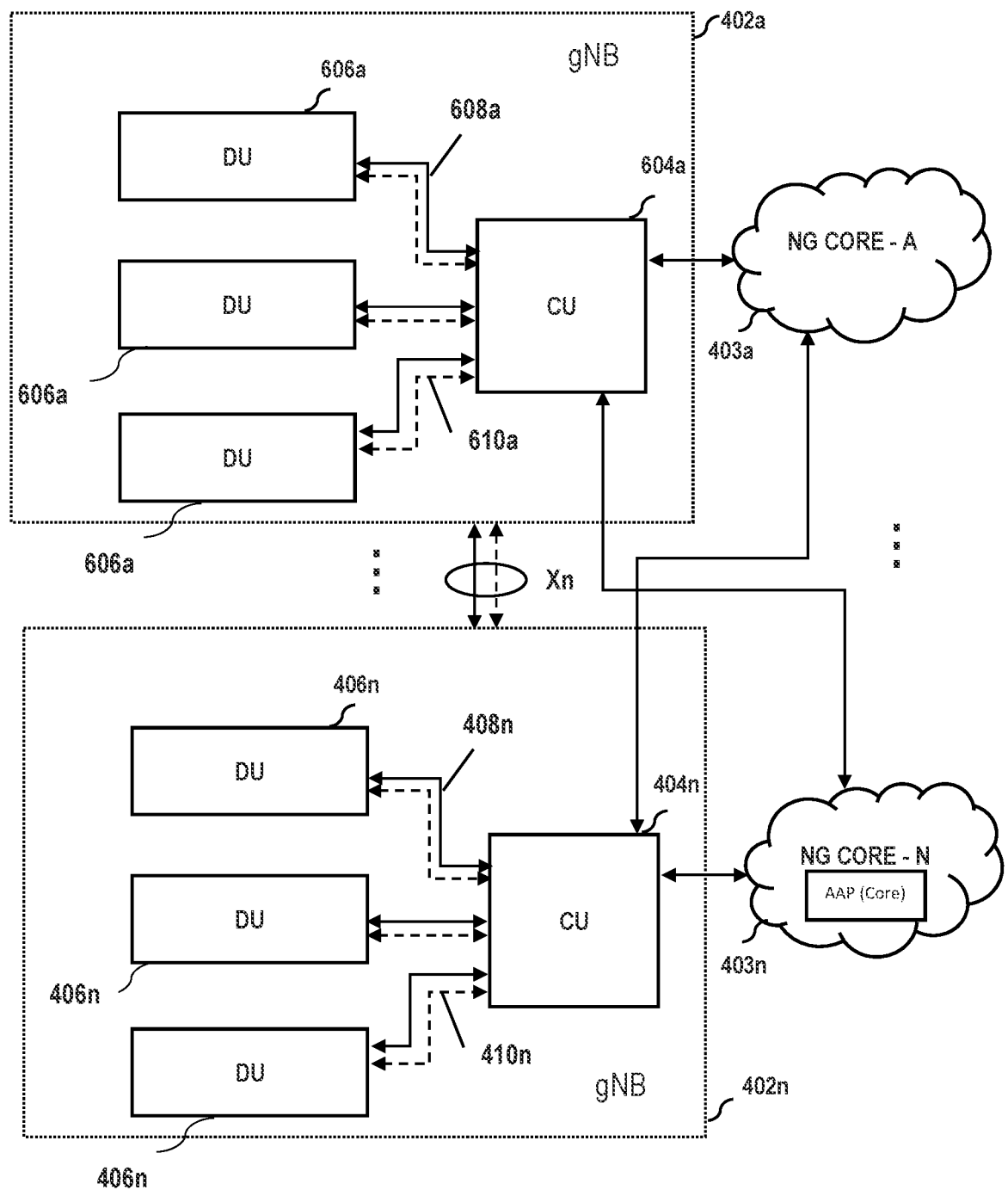
FIG. 4d is a functional block diagram of yet another exemplary embodiment of a gNB architecture including multiple CUs logically cross-connected to multiple different cores, according to the present disclosure.

In the architecture of FIG. 4d, two or more gNBs 402a-n are communicative with one another via e.g., the Xn interface 407, and accordingly can conduct at least CUe to CUe data transfer and communication. Moreover, the separate NG Cores 403a-n are logically "cross-connected" to the gNBs 402 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 402 other than its own, and so forth), or the gNBs 402 and NG Cores 403 may form a "mesh" topology where multiple Cores 403 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MNOs/MSOs, which is especially useful in e.g., dense deployment environments which may not be able to support multiple sets of RAN infrastructure, and conversely very sparse deployment environments where the MNO already has assets in the area, and the MSO can avoid the cost of installing and maintaining such infrastructure.

It will also be appreciated that while described primarily with respect to a unitary gNB-CU entity or device 404 as shown in FIGS. 4a-4d, the present disclosure is in no way limited to such architectures. For example, the techniques described herein may be implemented as part of a distributed or dis-aggregated or distributed CU entity (e.g., one wherein the user plance and control plane functions of the CU are dis-aggregated or distributed across two or more entities such as a CU-C(control) and CU-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 4a-4d. For instance, a given DU may act (i) solely as a DU (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-co-located with the eNB or femtocell, but still provide NR coverage within the macrocell coverage area.

In the 5G NR model, the DU(s) 406 comprise logical nodes that each may include varying subsets of the gNB functions, depending on the functional split option. DU operation is controlled by the CU 404 (and ultimately for some functions by the NG Core 403). Split options between the DU and CU in the present disclosure may include for example:
  Option 1 (RRC/PCDP split)
  Option 2 (PDCP/RLC split)
  Option 3 (Intra RLC split)
  Option 4 (RLC-MAC split)
  Option 5 (Intra MAC split)
  Option 6 (MAC-PHY split)
  Option 7 (Intra PHY split)
  Option 8 (PHY-RF split)

The foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios, including network slicing in support of target site monitoring and control. Factors considered in determining how/when to implement such options can include: (i) QoS requirements for offered services (e.g. low latency, high throughput); (ii) support of requirements for user density and load demand per given geographical area (which may affect RAN coordination); (iii) availability of transport and backhaul networks with different performance levels (including for network slicing); (iv) application type (e.g. real-time or non-real time); (v) feature requirements at the Radio Network level (e.g. Carrier Aggregation).

Methods

Figure 5:
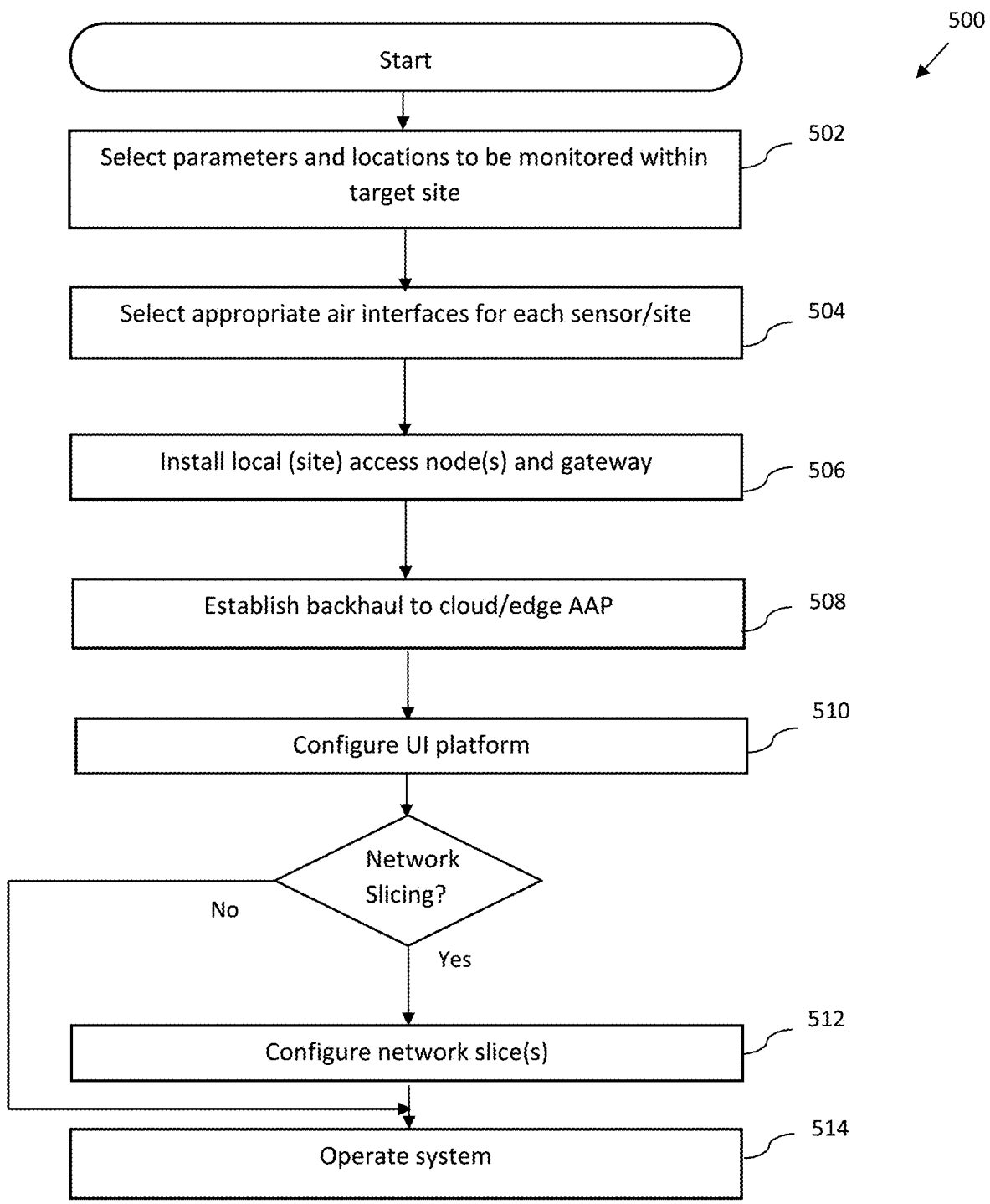
FIG. 5 is a logical flow diagram of one exemplary embodiment of a method of configuring and installing an integrated sensor architecture at a target site according to the disclosure.

FIG. 5 is a logical flow diagram of one exemplary embodiment of a method 500 of configuring and installing an integrated sensor architecture at a target site according to the disclosure.

As shown, the method includes first selecting parameters and locations to be monitored within target site per step 502. For example, certain key parameters such as temperature, humidity, wind speed, pH, etc. may need to be monitored for reliable assessment of then-current conditions. Likewise, certain data sources such as video or IR feeds may also be necessary. Such monitoring may be varied at each required location as needed.

Next, per step 504, appropriate air interfaces for each sensor/site are selected. Such selection may be based on, among other things: (i) indigenous interfaces within the sensors or their communicative access nodes (e.g., BLE, WLAN, etc.); (ii) access by the sensor to a local access node (such as a WLAN AP within range); (iii) the distance of the sensor (or access node) to the gateway; (iv) topological, radio path or even meteorological considerations such as interposed structures, trees, hills, relative elevation, etc.); and (v) relative power consumption by battery-supported devices.

Once the appropriate air interfaces are selected (or concurrent with their selection), the local (site) access node(s) and gateway 102 are installed consistent with the limitations of each interface per step 506. For example, LOS (line of site) based microwave or wireless communications (see e.g., the exemplary MicroTik Wireless Wire 60 GHz system) must have a direct path between transmitter and receiver and an operative range on the order of 600 feet; certain versions of WLAN only have a range on the order of a hundred or so feet, BLE on the order of 50 feet, and so forth. In one approach, the sensor data (temperature, humidity, etc.) is transmitted over LoRa so as to enable long-distance placement of the sensors from their receiver (e.g., the LoRa gateway of FIG. 2A). The exact placement of the sensors is selected based on what needs to be monitored at each individual site (i.e., location/distances involved, bandwidth requirements, latency requirements, whether a direct LOS exists or not, topography, interfering man-made or natural objects), etc.). It will be appreciated however that other considerations may be used in selecting location and configuration of the air interfaces, including factors such as ease of user setup and use, and simplification of operational aspects (e.g., battery depletion rates, availability of AC power, weather events (e.g., which can substantially interfere with mmWave band transmissions), etc.

For higher-bandwidth sensors or devices (e.g., 4K or 8K video), the data streams can be sent over comparably higher bandwidth air interfaces (e.g., the 5 GHz PtP links back to the router/LAN, which can then send the video streams over the backhaul connection).

Next, per step 508, backhaul to cloud/edge AAP 134 from the gateway 102 is established. In one variant, such backhaul is supplied by a single DOCSIS-based cable modem drop (e.g., where the customer has cable service to their premises). In another variant, a CBRS or C-band backhaul (such as via a FWA or CBSD which is itself backhauled by e.g., a DOCSIS or other modem, millimeter wave link, or the like) or gNB may be used to provide "last mile" connectivity between the gateway 102 and the cloud-based AAP 134.

It will be appreciated that on initial installation of the FWA apparatus at a target premises (e.g., farm), the methods and apparatus for device registration described in co-owned and co-pending U.S. patent application Ser. No. 16/661,865 filed Nov. 1, 2019 entitled "METHODS AND APPARATUS FOR DEVICE REGISTRATION IN A QUASI-LICENSED WIRELESS SYSTEM," and issued as U.S. Pat. No. 11,026, 205 on Jun. 1, 2021, which is incorporated herein by reference in its entirety, may be utilized consistent with the present disclosure to enable registration and spectrum grants for use by the FWA device (which may need to be operated at a comparatively high power in order to establish sufficient connectivity and signal quality (e.g., SINR) at the serving base station (CBSD).

It will further be appreciated that in the case where the target premises and associated FWA device is sufficiently distant from its serving base station (e.g., CBSD), methods and apparatus for bandwidth supplementation or relay may be utilized consistent with the present disclosure to enable suitable performance of the backhaul (e.g., as measured by its service level agreement (SLA) requirements). For instance, in one variant, the FWA apparatus described herein is configured to include an iPerf packet performance analysis logic module (e.g., software or firmware) as well as a MPTCP (Multipath TCP) stack at its transport layer in order to enable suitable data rates in one or both of DL and UL in support of the prevailing SLA. This approach advantageously allows the serving network operator (e.g, MSO) to extend wireless coverage of sufficient quality into areas without the associated CAPEX of installing additional base stations and associated backhauls (e.g., DOCSIS or fiber or mmWave) in support of the new base stations.

Next, per step 510, the UI platform is configured for operation with the AAP. In one variant, an application is downloaded onto the user platform (e.g., UE or VR system), the application enabling real-time receipt from the AAP (indirectly via the service provider infrastructure) of streamed high-quality video and other relevant data, as well as control functions via the UI.

Next, if network slicing is utilized, the bearer network is configured according to one or more network slice(s) per step 512. In one variant, the MSO and any MSO/ISP involved in delivery of the content, data, or commands cooperate to dedicate a certain priority one or more aspects of their infrastructure to the established slice(s). This may be via e.g., prior agreement between the network operators, or other mechanism (e.g., negotiation at time of establishment of the slice(s).

Once the network is configured end-to-end, the system may be operated according to step 514.

Figure 6:
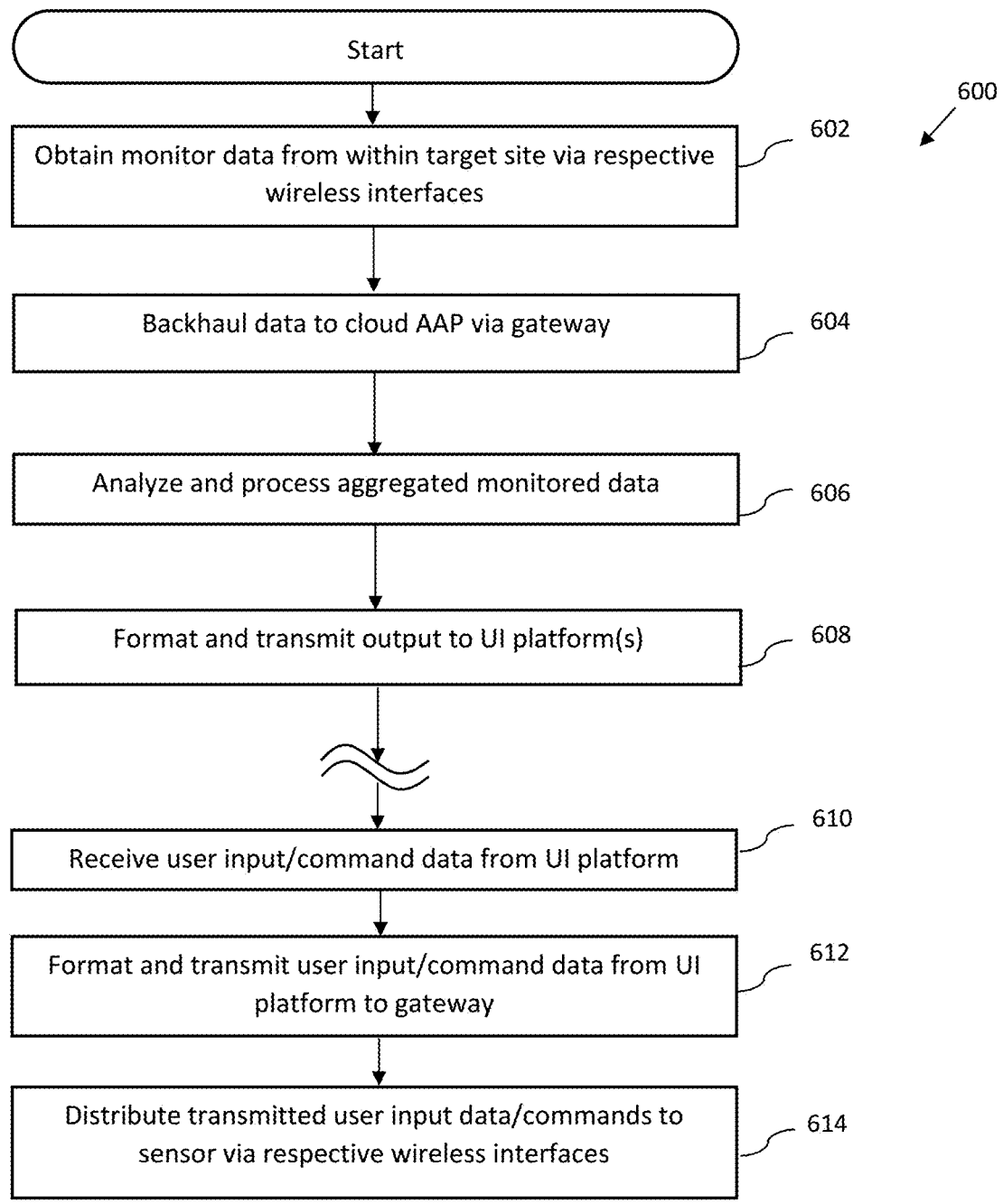
FIG. 6 is a logical flow diagram of one exemplary embodiment of a method of operating an integrated sensor architecture according to the disclosure.
Figure 7A:
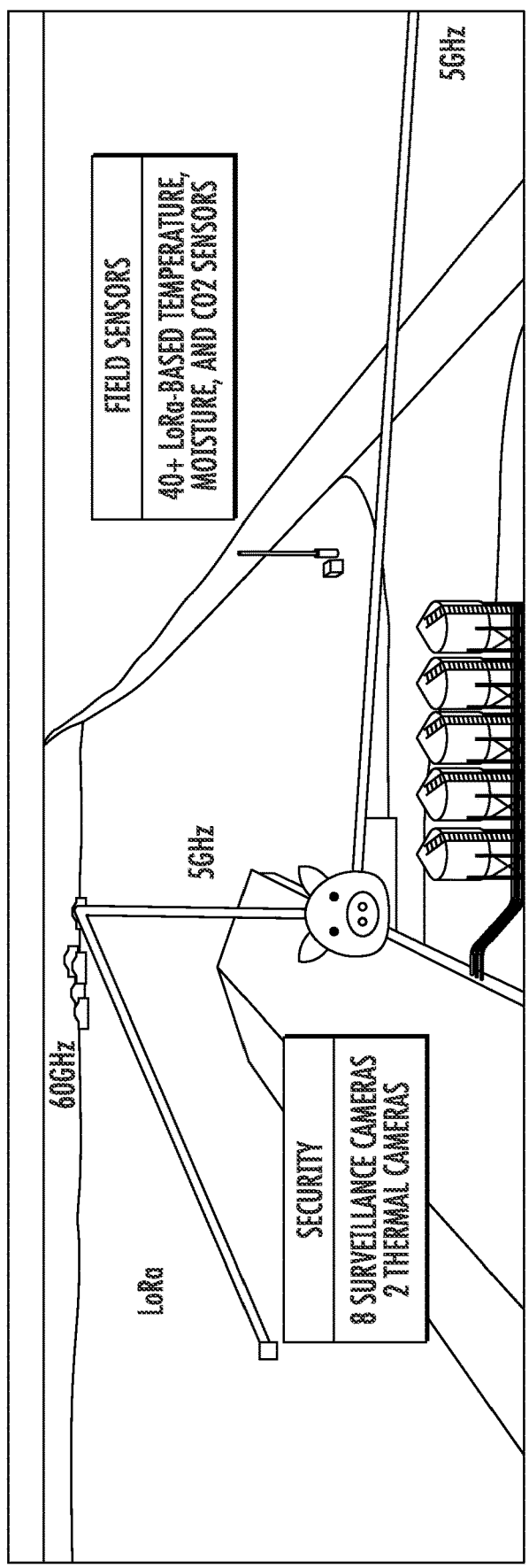
Figure 7B:
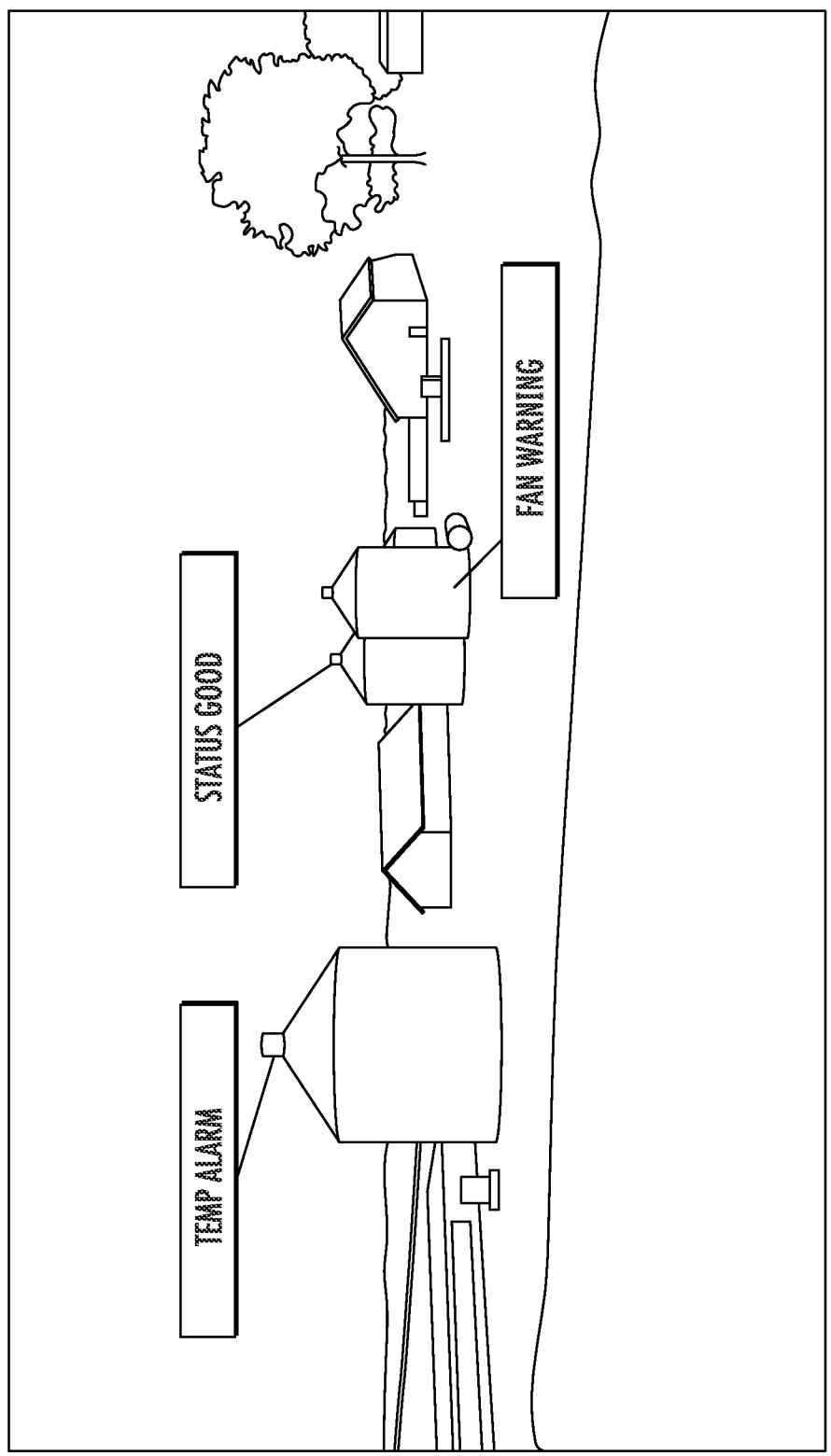
Figure 7C:
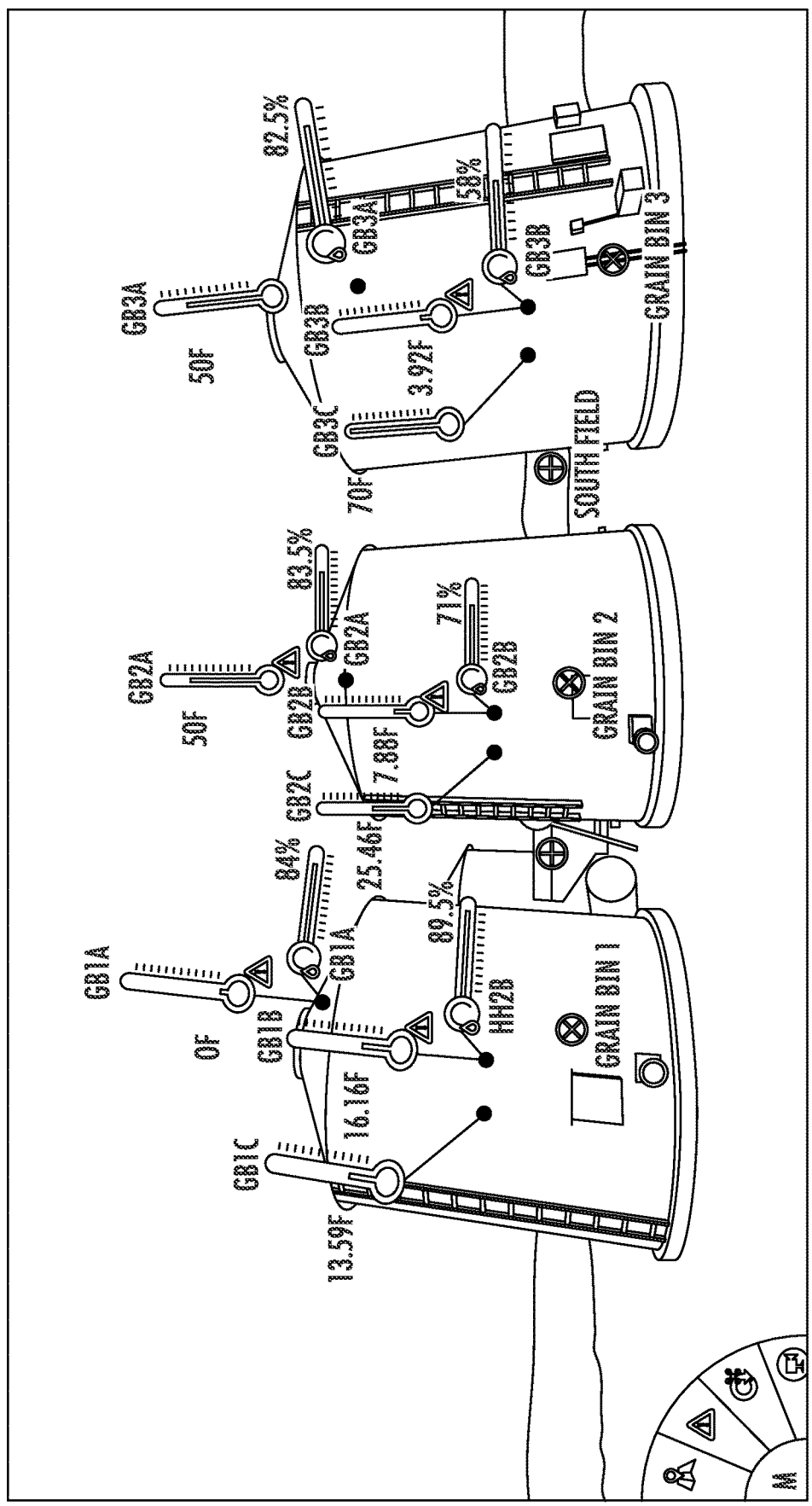
Figure 7D:
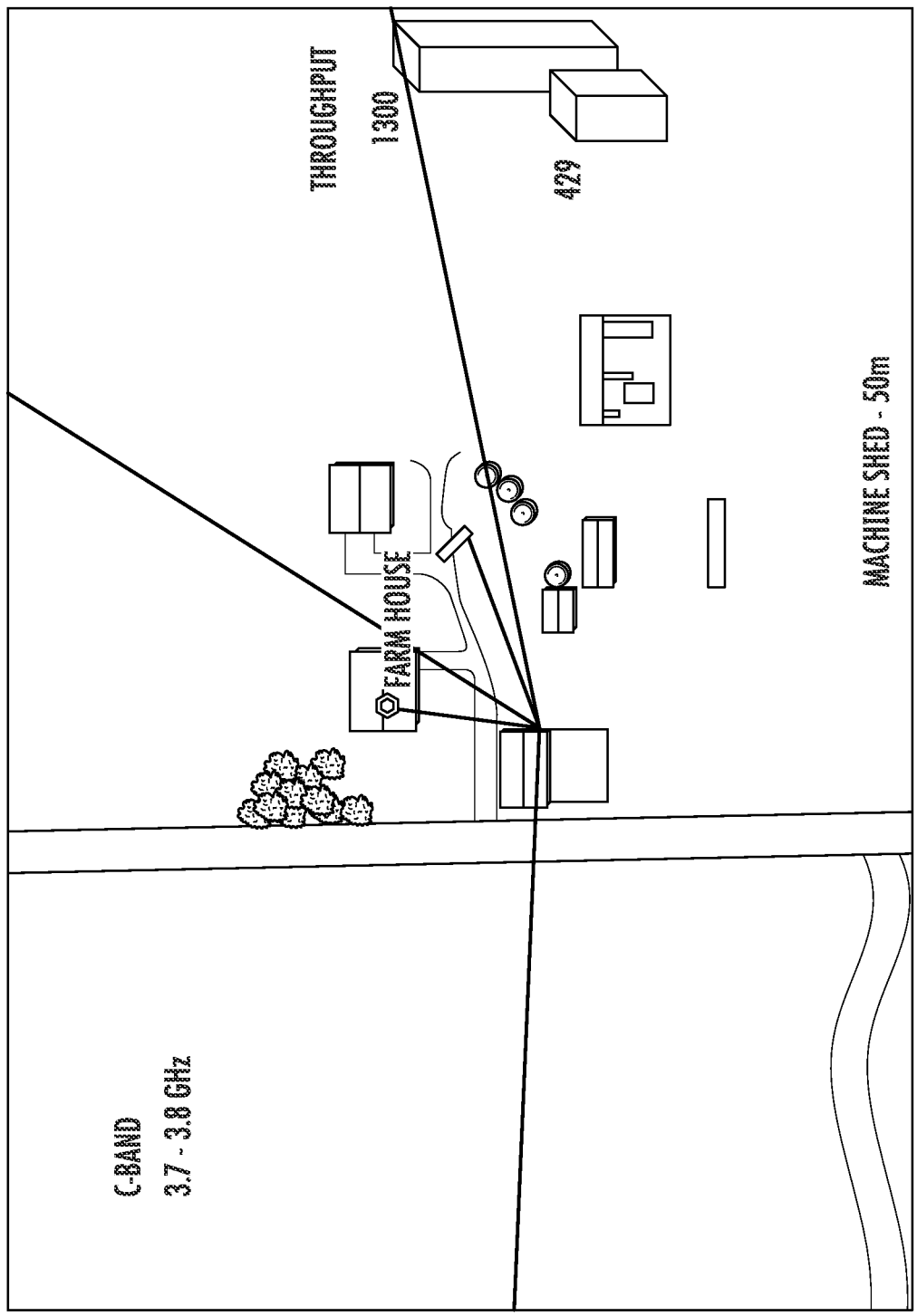
Figure 7E:
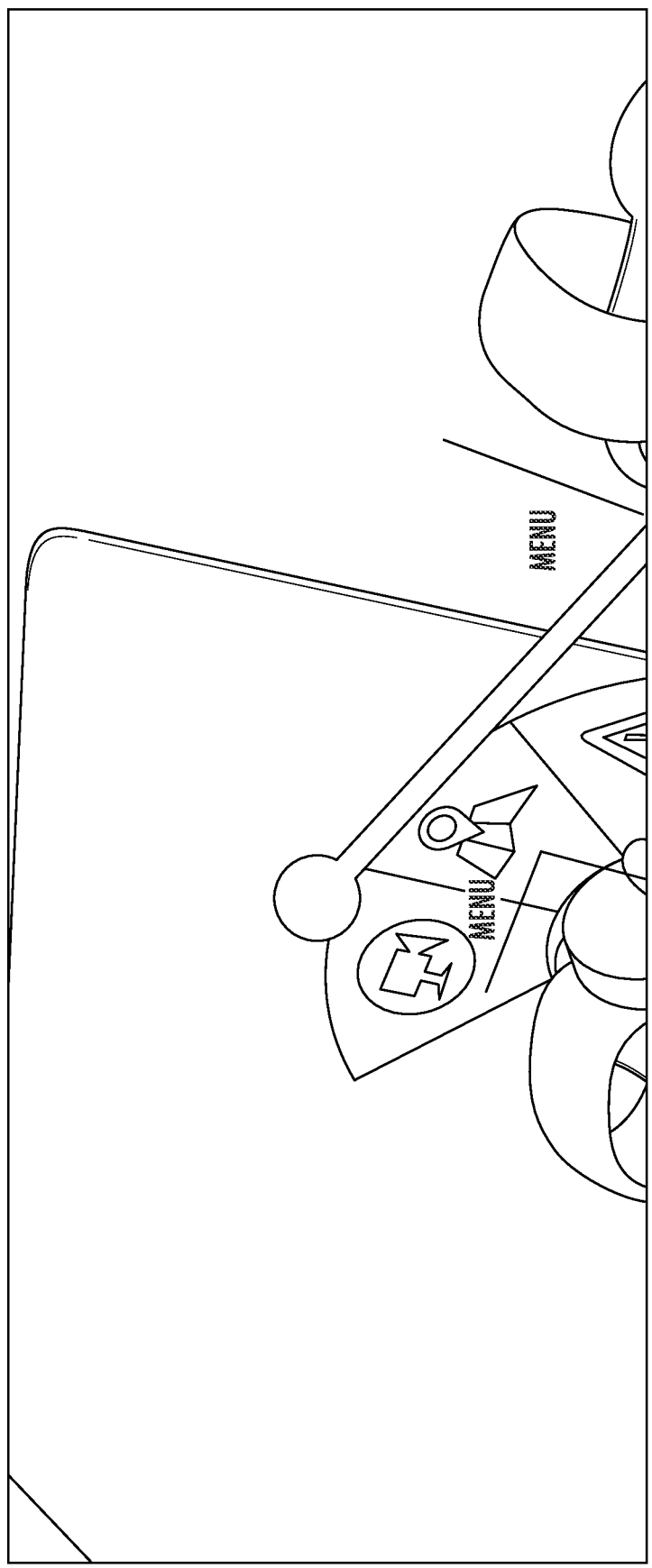
Figure 7F:
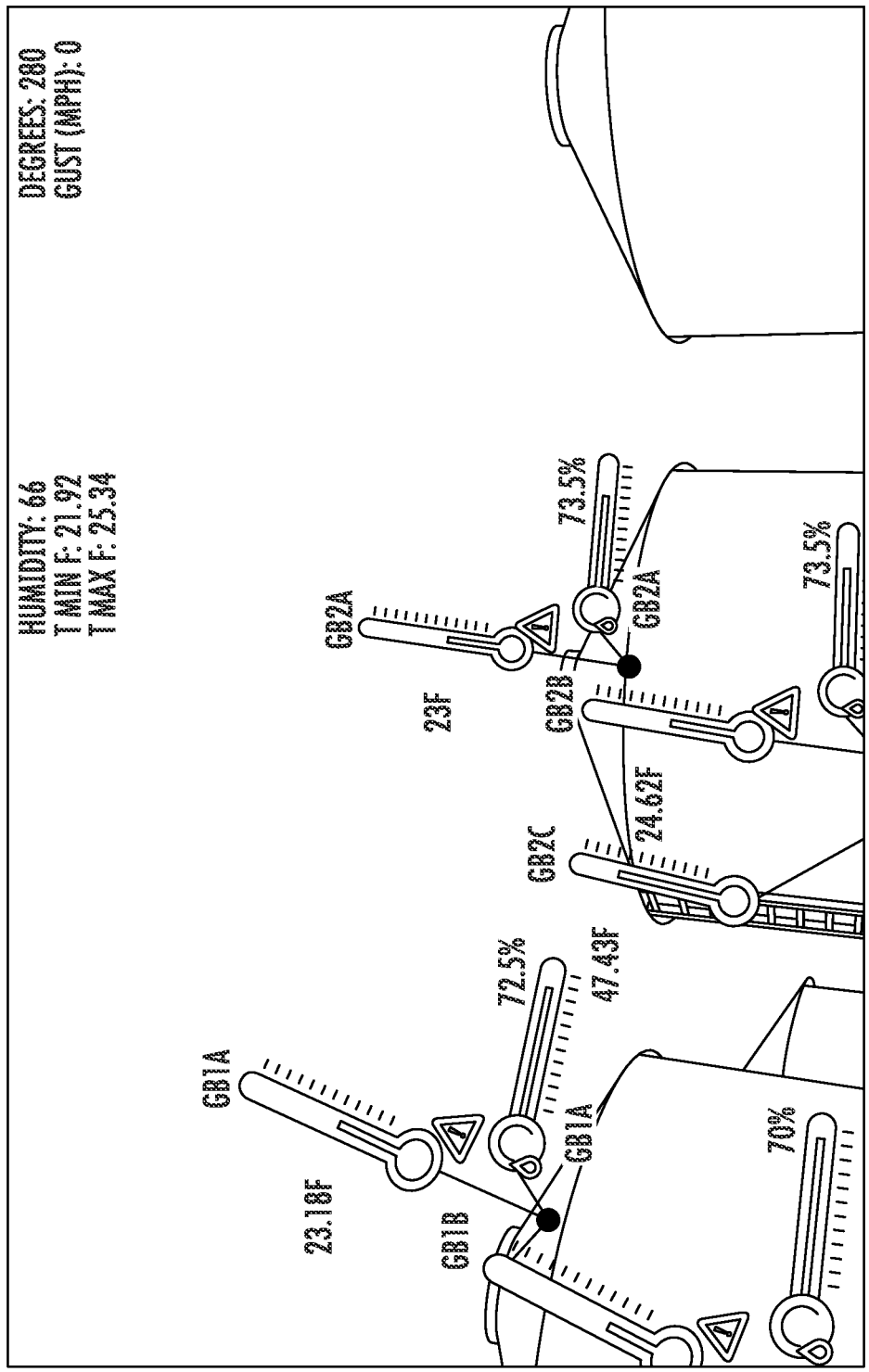
Figure 7G:
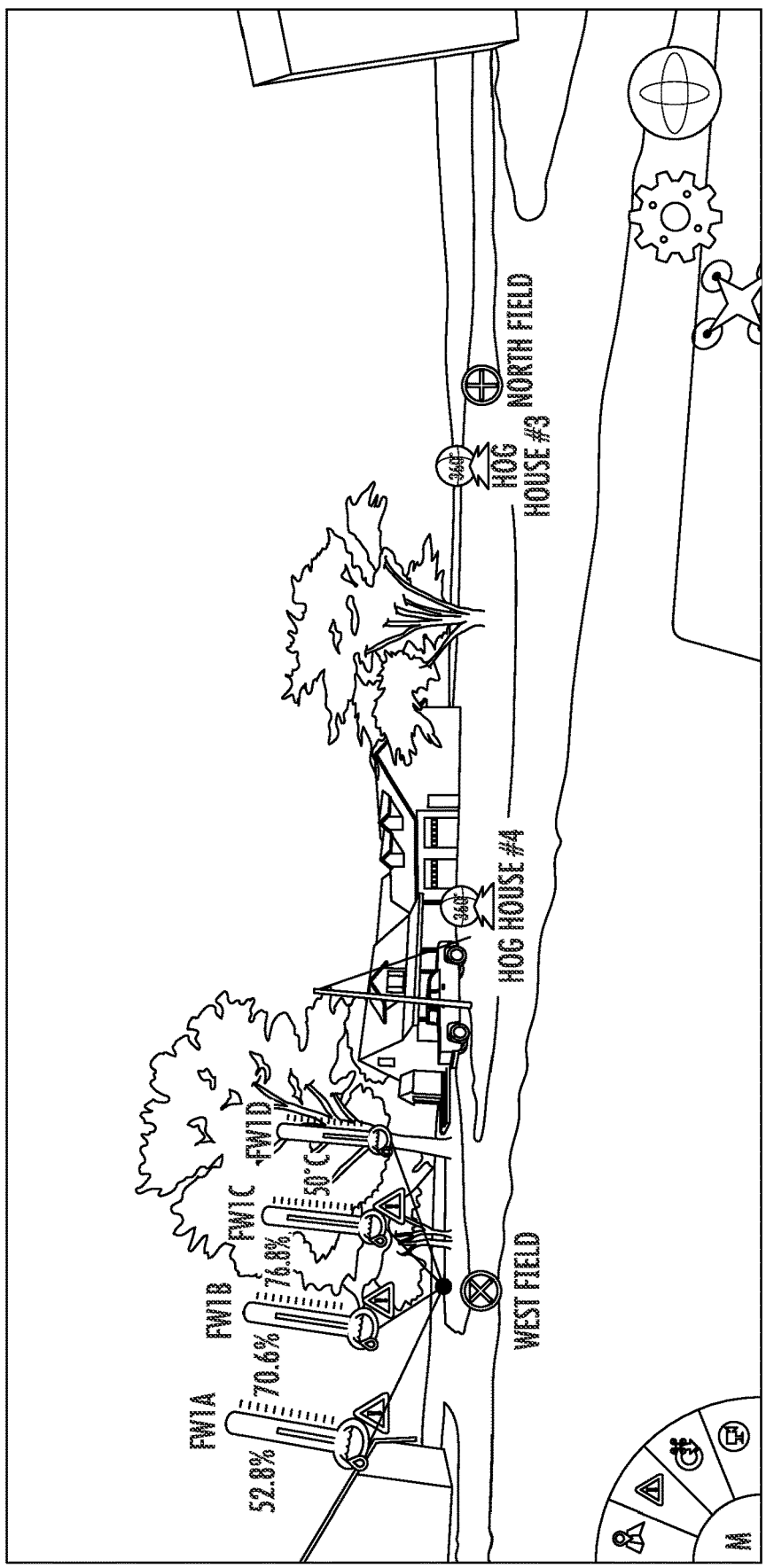
Figure 7I:
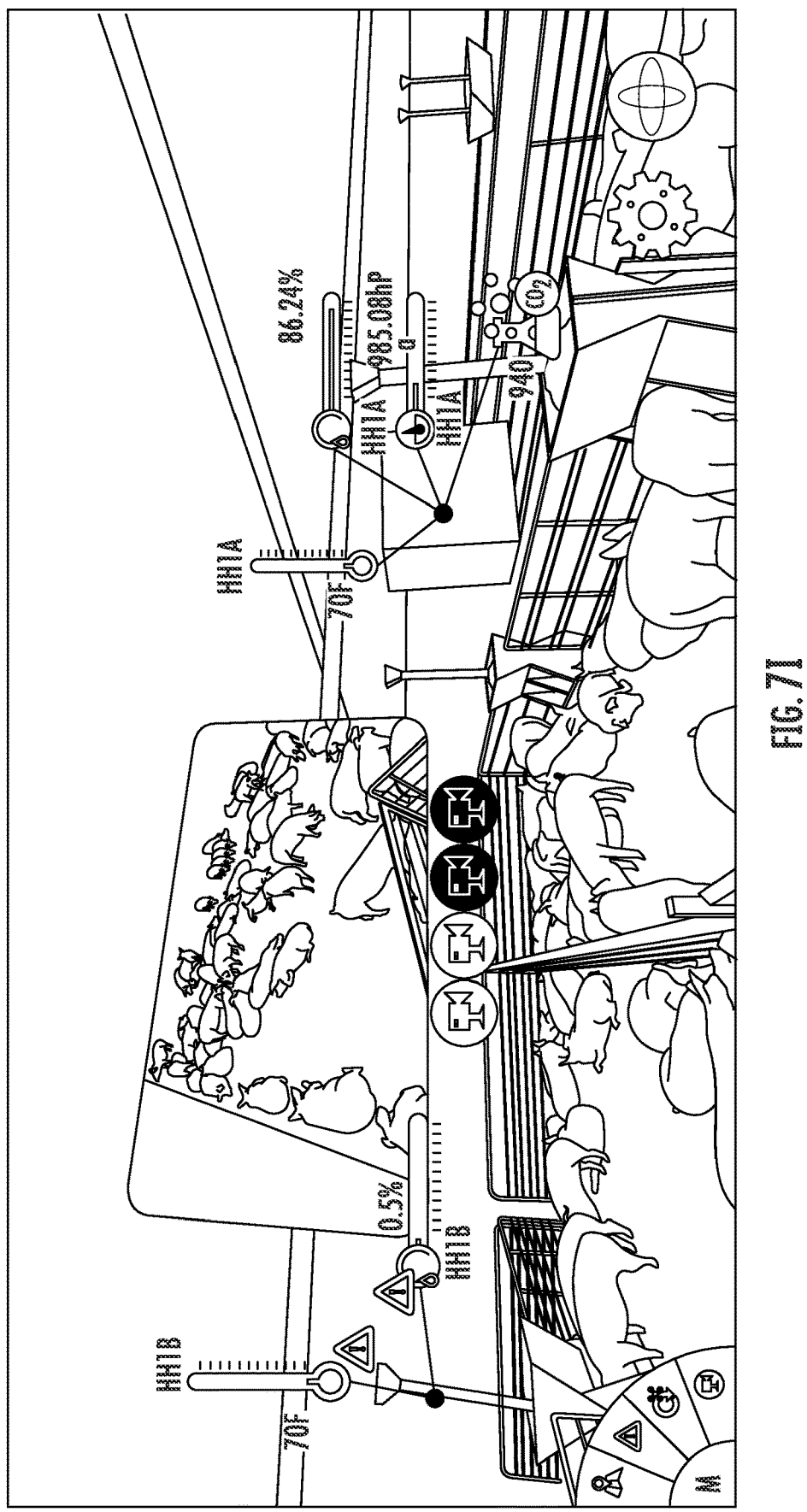
Figure 7J:
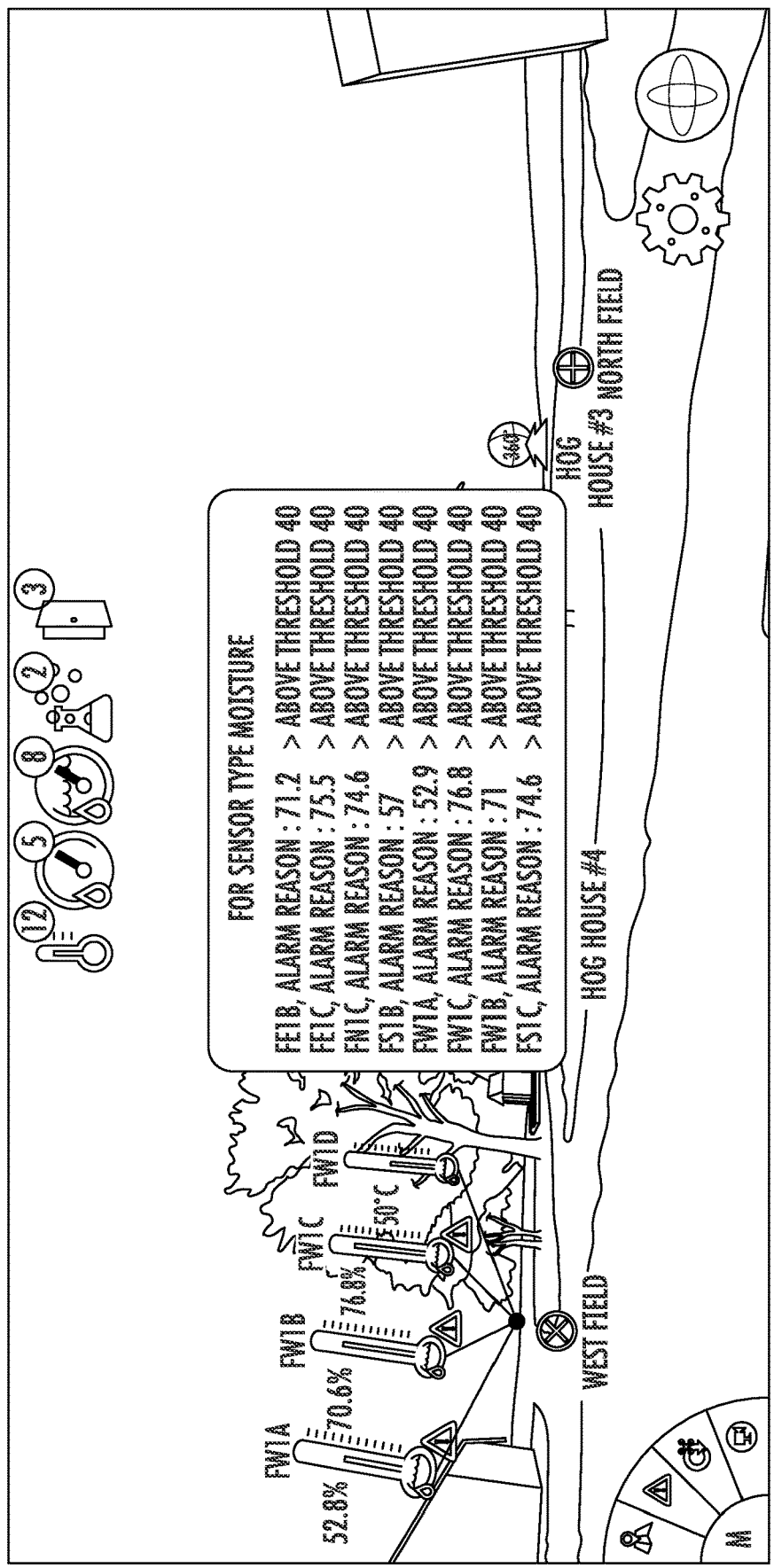
Figure 7K:
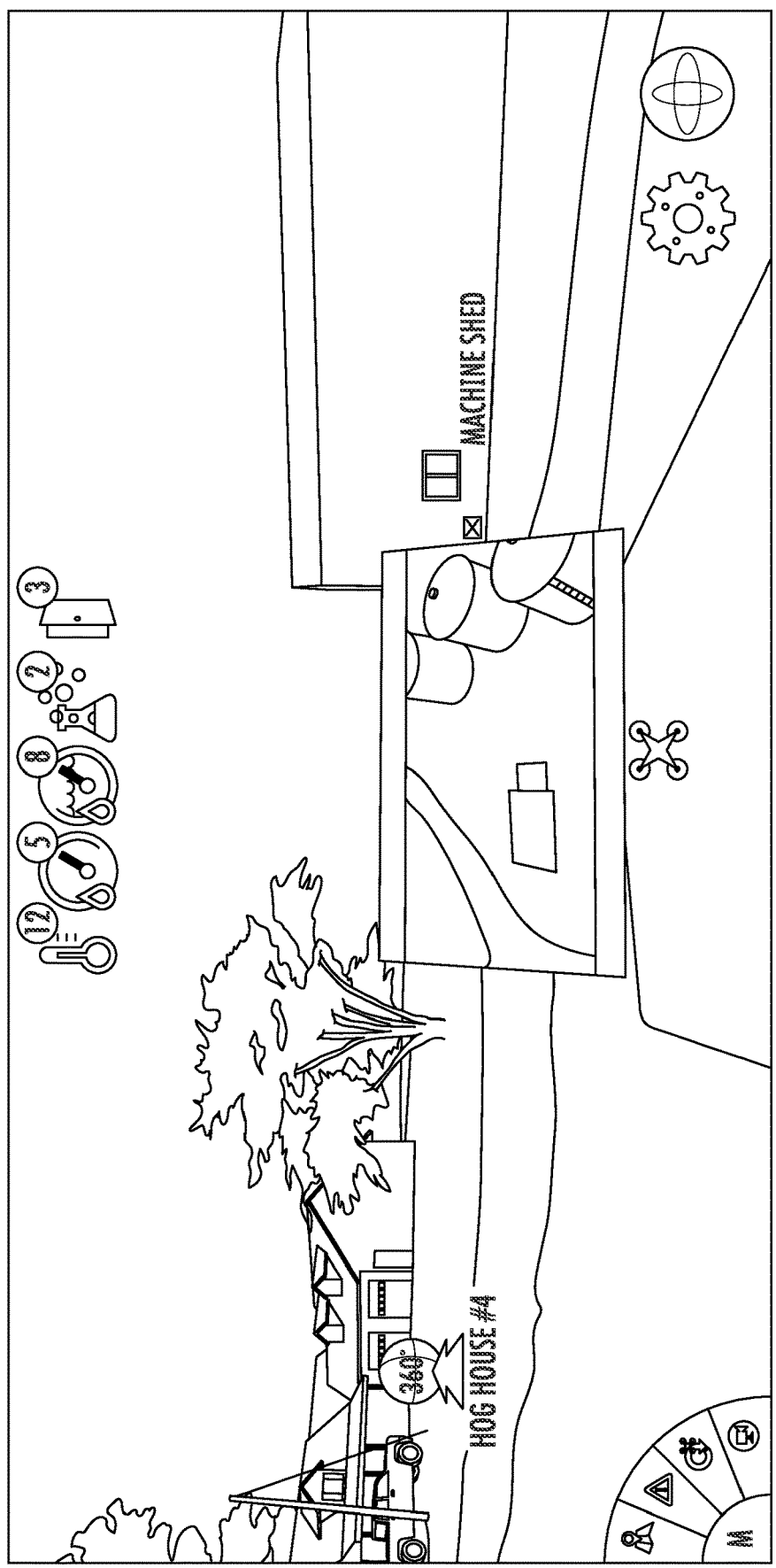

FIG. 6 is a logical flow diagram of one exemplary embodiment of a method of operating an integrated sensor architecture according to the disclosure. In a first step 602, monitored data is obtained from within target site via respective wireless interfaces. For instance, as previously described, the 8K 360-degree video is obtained via a 60 GHz IEEE Std. 802.11ad LOS link between the 360-degree camera and the gateway 102.

Next, per step 604, the data is backhauled to the cloud AAP via the gateway 102. As previously described, the data may be backhauled via one or more types of apparatus such as DOCSIS modem (if a cable drop exists at the site), CBRS FWA/CBSD, 5G NR gNB, or other mechanism. In one variant, video data is streamed via RTSP from the gateway to the target AAP(s) 134.

Per step 606, the backhauled data is aggregated, analyzed, and processed by one or more of the AAP entities. As previously described, this may occur at the edge of the operator network (e.g., within a gNB, CBSD, CMTS management entity, or edge switching node) if so configured, or back at the core of the network (e.g., MNO 5GC, MSO headend, etc.). This aggregation, analysis and processing may include for instance: (i) collection of data from a sufficient number of sensors, which may require active collection requests be issued by the gateway to the various sensor nodes as previously described); (ii) temporal association/filtering of data (e.g., to match up the time periods of the data so that latent data is excluded, and the UI platform receives temporally coherent data); (iii) noise removal, filtering, and/or reconstitution, such as to clean up or remove degraded data received from the site which may detract from user experience; (iv) generation of one or more data structures (e.g., JSON files and RTSP or other media packet streams) for transmission to the UI platform application software, and/or (v) transcoding/transrating of video data as may be required for delivery to the target UI platform. For instance, in one variant, degraded source RTSP video from the site is decoded, enhanced/filtered by the APP or a proxy process, and then re-encoded in the appropriate codec format for the target UI platform application.

Analytics run on the data may also include: (i) comparison of data to data from comparable or the same sensor(s) in prior historical periods; (ii) comparison of data to data from comparable sensor(s) from another site either contemporaneously or based on prior historical periods; (iii) trend analysis such as linear regression, such as to identify desired or undesired trends in parameters; and/or (iv) machine learning (ML) such as to identify one or more patterns or events within the data based on prior historical and contemporaneous data (e.g., water consumption patterns over time correlated with weather).

Per step 608, the data to be transmitted to the UI platform (e.g., JSON files and streaming video data) is formatted for transmission as needed and transmitted to the UI platform(s) via a selected bearer (e.g., 3GPP compliant link, such as a 5G NR infrastructure operated by an MNO). It will be appreciated that while 5G NR systems are by design and advantageously backwards compatible with prior (e.g., Release 15 and prior) 3GPP LTE/LTE-A systems, use of such legacy infrastructure may degrade at least some aspects of the performance of the system, such as when UHD video and VR/AR systems are utilized, the latter requiring very low latency to avoid any degradation of user "immersive" experience. However, the exemplary embodiments of the present disclosure will suitably operate, all be it perhaps not at optimal experience, when using the prior generation infrastructure.

Other data may be pushed to the UI platform as well from the AAP or a proxy node, including e.g., (i) weather or emergency alerts associated with the monitored site or the user's UI platform current location, (ii) maps and traffic data/alerts for paths of travel between the monitored and monitoring locations (e.g., which may be sourced by accessing a Google or similar web API for the monitored site with appropriate code to invoke return of local map data, traffic conditions, etc.), (iii) information on vendors or service providers local to the monitored site for various types of services such as repairs, deliveries of goods, etc. (e.g., which may be sourced by accessing a Google or similar web API for the monitored site with appropriate code to invoke return of local merchant data); (iv) recommendation data for the specific user (see discussion below), and/or (v) data obtained from electrical, water, or other utility service providers (again, which may be accessed via e.g., web-based API call to the service provider for user-specific account information, or a smart meter on the site itself) regarding current consumption, operational status, etc.

Per steps 610 and 612, user input/command data is received from the UI platform at the AAP 134 or a designated proxy, or other node of the network, via the data link provided by the user's MNO or other service provider and the MSO network as required, and formatted (as needed) and transmitted to the target recipient. Such data may include for instance user inputs via the UI platform application (e.g., user VR inputs via e.g., instrumented VR gloves, selection of UI functions, user voice received via a UI platform microphone, ADC and digital audio encoder, UI or voice commands for specific monitored sensors or other devices, etc. To this end, the UI platform may also be configured with a SR (speech recognition) system which digitizes the user's analog voice input, and accesses (e.g., via cloud-based server and API) a recognition service to return a digitized and recognized representation of the user's words (contrast: digitization of the user's voice prior to recognition). The returned recognized voice data is then transmitted to the AAP or other target platform (e.g., gateway or monitored sensor/device) for implementation of the user's command (e.g., "turn off Valve 123" or "check tank levels" or such).

It will be appreciated that while the AAP entities herein may act as the logical endpoint or waypoint for the UI platform input/command data, a wholly separate channel and process may be utilized for this purpose; e.g., a 5G NR network slice dedicated to just this type of traffic coming toward the monitored site. Moreover, the AAP may be "bypassed" in this channel (whether dedicated or otherwise) such as where the gateway 102 is the endpoint for the transmitted command/input data (such as via an IP address associated therewith in the form of 32-bit address such as AAA.BBB.CCC.DDD or similar). Likewise, the individual sensors/devices/access nodes at the site may have their own unique network addresses (e.g., IP addresses) which may act as the target for the UI platform-initiated transmissions of user input or command data.

For example, in one embodiment, the video cameras in the "hog houses" of the exemplary trial discussed herein were provided individual IPv4 addresses, and could be accessed remotely through e.g., a VPN. In one variant, the local router 253 (FIG. 2A) is used to perform network address translation (NAT). It will be appreciated that IPv6 or other addressing may be used as well consistent with the present disclosure.

As previously described, LoRa does not use IP but it has its own protocol for addressing the endpoints which is performed in one embodiment by the LoRa server 273 and conveyed over a separate VPN through the LoRa gateway to the device. Alternatively, the endpoint addressing functionality may be included within the on-site LoRa gateway 254 itself.

User-generated audio may also be streamed (e.g., via RTSP or other protocol) back to the gateway or target sensor/access node/device, such as for playout "live" at the site (e.g., via installed audio speakers within a given structure), such that e.g., the monitoring user can vocally communicate with humans or other beings present at the site in real time.

Hence, the present disclosure contemplates various degrees of logical and physical "coupling" of the AAP within the user input/command processes, ranging from complete decoupling to active coupling (e.g., where the APP can obtain data relating to the user's inputs, frequency, date/time, commands, activities, etc. relative to the monitored site, so as to enhance the data available to the AI/ML algorithms of the AAP. In this fashion (when coupled), the AI/ML algorithms may learn typical or atypical user responses, patterns, etc. to given scenarios or fact patterns existing at the site, and inter alia, make predictive recommendations to the user (via the UI platform), or take other anticipatory actions such as e.g., increasing water flow to irrigation in anticipation of an extremely hot day, reschedule electrical power utilization in the event of a "blackout" or mandatory/elective reduced energy consumption period from a service provider, switch between solar and grid power based on prevailing weather conditions, etc.

Lastly, per step 614, the transmitted user input data/commands are distributed to their respective sensors/devices/access nodes via their respective wireless interfaces. It will be appreciated that while bi-directional higher-layer logical links between sensors or controlled devices and a wireless access node (which may also be the gateway 102 itself depending on configuration) are contemplated in many instances, uni-directional links may be employed in certain use cases as well. For instance, there may be no need for a given device or sensor to be able to receive command or other data (e.g., it is purely a passive, one-way sensor that outputs data and has no other functionality). While the underlying PHY (air interface) protocol may negotiate data, authentication, access, etc. according to the technology protocol, there is no need for transmission of application-layer or logical layer data to the sensor/device.

Smart Farm Field Trial—

FIGS. 7a-7k are graphical representations of various aspects of an exemplary installation and trial of an integrated sensor architecture conducted by the Assignee hereof at a target farm site, including exemplary user interface functions.

Specifically, a field trial was conducted with seventy-four (74) individual IoT sensors. The sensors included, inter alia, door monitors, soil monitors, motion detectors, electric meters, water meters, temperature sensors, humidity sensors, various weather sensors, cameras, security cameras, thermal cameras. For the field trial, many of the LoRa sensors were developed for specific applications.

Figure 1A:
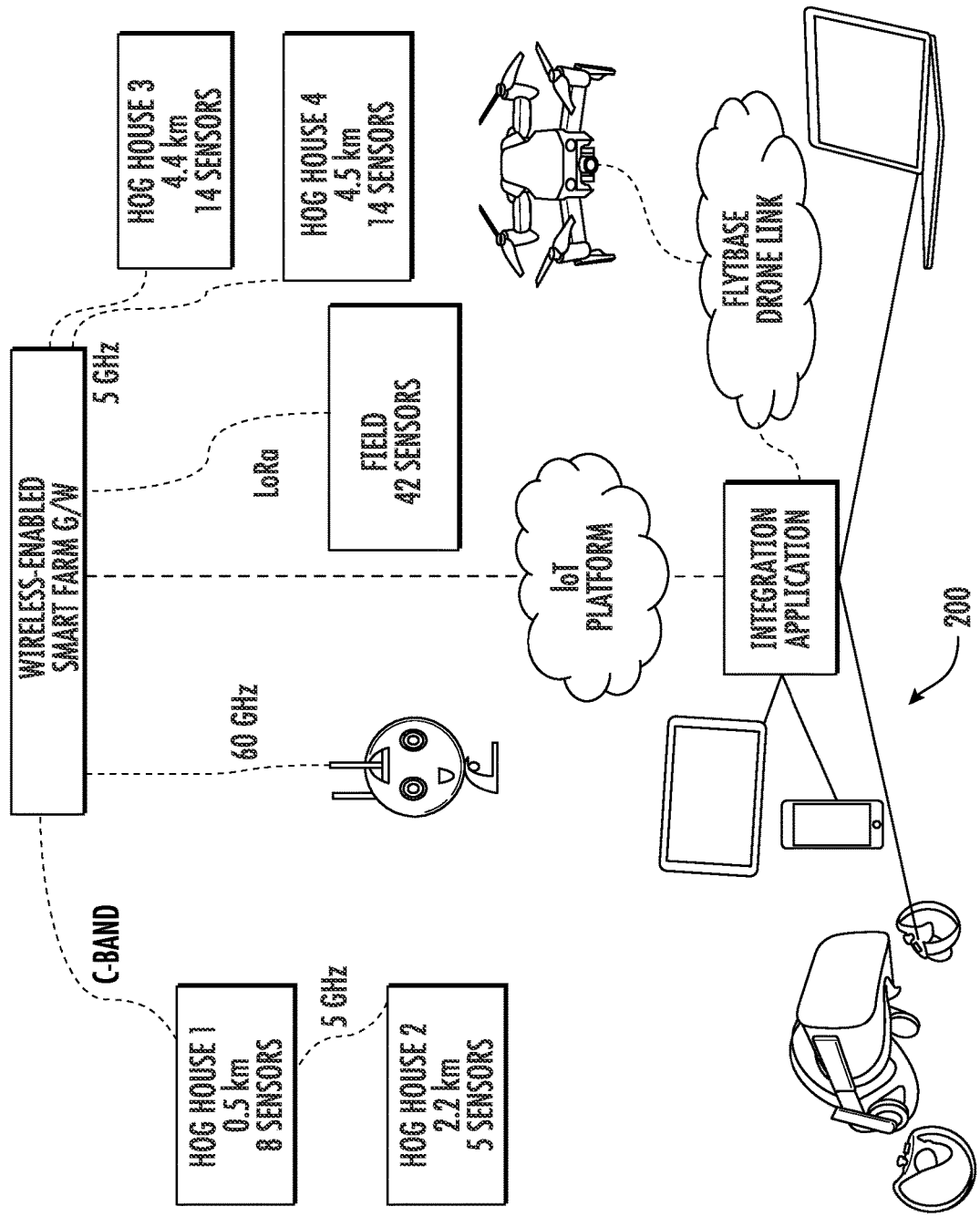
FIG. 1A is a high-level graphical representation of the "smart" architecture of FIG. 1 as applied to an exemplary farm site.

FIG. 1A is a high-level block diagram showing the configuration and architecture validated and tested at the "Smart Farm" trials conducted by the Assignee hereof. As illustrated in the diagram, C-Band, 60 GHz, 5 GHz, and LoRa were tested to enable data collection from various sensors at four hog houses, a field, and an 8K 360-degree camera. 360-degree video was used to capture the environment of all directions in every video frame. Watching a 360° video, especially using a head-mounted VR display of type previously described herein, advantageously provided a more immersive experience compared to watching a normal video, because the viewer was "surrounded" by the video, and could also choose the preferred viewpoint using the UI platform application. Streaming 360-degree video in this test required bandwidth allowed by the 5 GHz and other wireless systems employed in this validated field trial.

In operation, sensor information was collected and aggregated and sent to a Nokia IoT Platform. A customized UI platform application (i.e., a Technicolor Unity Application) was used to display the video streams and sensor data in an immersive VR user interface using an Oculus Rift VR device. The test Unity Application was been designed for Oculus Rift and Android devices. It consists of the following features: 1× 4K 360 degree livestream using RTSP; 2× 720p Thermal cameras using RTSP; 6× 1080p Livestock Monitoring cameras using RTSP; and 1× Mavic Pro Drone livestream using RTSP. See FIGS. 7g-7k.

For the exemplary trial, a mobile 5G NR network apparatus was utilized, including: (i) 5G NR radio unit; (ii) 5G NR baseband unit; (iii) 4G radio unit; (iv) 4G baseband unit; (v) 4G/5G non-standalone packet core; and (vi) application servers. The 4G link referenced above was utilized for non-standalone (NSA) core network operation (i.e., the 4G connection was required to anchor and establish the 5G connection), although it will be appreciated that the various aspects of the present disclosure may be utilized with both NSA and SA (standalone) 5G configurations.

As shown in FIGS. 7a-7k, the trial system further included a total of fourteen moisture sensors in the surrounding fields. Moisture probes at multiple soil depths were deployed to provide readings at 1 ft, 2 ft, and 3 ft levels. The sensors operated on the LoRa system, and provided soil moisture measurements every hour. The purpose of using sensors at multiple depths was to provide an understanding of the moisture levels for the entire root depths of the crops.

Five grain storage bins were located at the main farm complex. These bins are used to store the harvested grain and provide an environment for drying the grain to optimum moisture levels for sale on the market. Multiple sensors were deployed in each of the grain bins to measure temperature and humidity levels. One sensor was attached to the underside of each bin roof and a second identical sensor was suspended from a rope and deployed inside the grain about 2 meters from the top of the bin. The reason for this was to compare the readings from the two sensors to see if there is an appreciable difference between them due to placement in the bins, and to investigate the amount of RF penetration loss of the grain in the bin for given air interface technologies and frequencies.

In each of the four hog houses, there were deployed two different types of environment monitors. The first type is the same type as was deployed in the grain bins to monitor temperature and humidity. The second type was more capable and monitors temperature, humidity, $CO_2$ levels, as well as barometric pressure.

Door monitors were deployed on each entry door of the hog houses as well as the machine shed in the main farm complex. Using an activation magnet these sensors are triggered by door open and close events and simply send an event message to the LoRa network which is recorded by the IOC system. The IOC system can be configured to generate alarms upon door events during certain hours of the day. The alarms can send notifications to alert individuals of the events.

Different equipment monitors were used, including for fans, shades, feed trough, bin blower, well pump. Relays are used to trigger the sensors. There was also a well pump being monitored that was over 2 km distant from the gateway.

A custom device using Pycom main board and GPS shield was also used, and mounted on a tractor. It was powered by 12V from the vehicle electrical system. Once synchronized to the GPS constellation, it transmitted a position reading via a custom LoRa message every 12 seconds.

Wi-Fi connections were set up between the hog houses and the farmhouse complex. Point-to-point 802.11ac at 5 GHz was used for the longer distance links (500 m-4.5 km), and point-to-point 802.11ad at 60 GHz was used for high bandwidth shorter distance links (<100 m).

Each of the four hog houses had two HD video cameras mounted therein. This allowed for monitoring of the livestock from anywhere. The required bandwidth for the HD RTSP video streams (~4 Mbps) was too high for the installed LoRa system, so the video streams were carried by the Wi-Fi links.

In one of the hog houses (FIG. 7i) there were an two additional FLIR thermal cameras. With additional computing resources such as via the AAP, it is is possible to recognize deceased animals, and send notifications upon detection which would provide an increased benefit to the livestock manager. The cameras were installed to determine system requirements for support of such a feature.

In one deployment, the data from the deployed devices utilized 900 MHz, 5 GHz, and 60 GHz. The data was sent to a central custom-configured Kerlink Gateway which fed into the Nokia IoC IoT platform.

In the center of the farm, an 8K 360 degree video camera was mounted. This was a central vantage point that allowed the farmer to see relevant data from all directions. The 360 camera live feed was streamed over a Micro-Tik 60 GHz "Wireless Wire". Each camera's live feed utilized RTSP. The Nokia IoC parsed the IoT data and pushed it to Technicolor's Unity App via periodic JSON files.

Additional features used in the Smart Farm test run included toggling the livestream on and off, utilizing local map data, and hand presence through Oculus Touch controllers or similar VR equipment.

Soil quality may be monitored by volumetric water content sensors. Weather conditions and forecasts may be combined with data from sensors to optimize harvesting. The system may alert the user of weather forecasts that would normally adversely impact farming given the current status of the farm from the aggregate of sensed data and allow for automatic and manual preventive measures to decrease the chance of negative impacts, for example, loss of crops.

Sensors may monitor pest behavior on the farm. For example, an image sensor placed on a pest trap may signal when the number of pests caught in a trap exceeds a specified threshold or an image sensor can be used to monitor the Leaf Area Index (LAI) in a group of crops. Similarly, an acoustic sensor may monitor for pests that exceed a specified threshold.

IoT sensors can play a large role in the management of crop irrigation. Data gathered from the system may be utilized to monitor the vitals of animals on the farm, such as, respiratory rate, temperature, blood pressure, and heart rate. For example, Farmers can use the data from the IoT sensors to monitor feeding issues and reproductive cycles of animals. IoT sensors may track locations of livestock. Data from location tracking of livestock is beneficial for locating sick animals, optimizing grazing patterns, and monitoring inventory.

Silos that may store silage (grass or other fodder harvested green and wet) may be monitored for moisture and other conditions to prevent spoilage. Bins storing, for example, dry corn and soybeans, may be monitored to meet requirements for domestic or export markets.

Moisture sensors can predict the presence of fungi possibly saving entire crops. Temperature sensors and smart heaters work together to keep grain dry, decreasing waste and maximizing yield.

Remote drone management saves on time and labor costs. Use of a drone with cellular or other wireless connectivity provides an additional dimension. Specifically, when something goes wrong on the farm, the drone can be launched (including remotely at the control of the UI platform, which may include an integrated drone controller application) and to send a live stream back to the handset. Drones can also be modified to perform specific tasks such as crop spraying. Advantageously, use of low-latency 5G links enables sufficiently non-latent video imagery and control of the drone (i.e., uplink and downlink from the UI platform) such that the control (flying) of drone is manageable from a remote location. Moreover, the drone may be equipped with an inductive battery charging system such that, upon battery depletion, the drone returns to a prescribed coordinate for landing, the landing coordinate placing the drone in suitable position for inductive recharging of its battery without (human) user presence at the site; i.e., no user is needed to make or break electrical attachments such as electrical plugs.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a facility management and control system, the computerized method comprising:
    obtaining a plurality of data derived from a plurality of different sensors sensing respective ones of operational parameters associated with the facility;
    obtaining a plurality of at least video data derived from at least one camera associated with the facility;
    backhauling the obtained plurality of data and the plurality of at least video data via a wireless interface to a managed network node, the managed network node comprising at least one sensor data aggregation and processing process;
    processing the backhauled plurality of data and the plurality of at least video data at the managed network node to generate a composite at least video data and sensor data stream for delivery to the facility, wherein the processing comprises identifying one or more patterns within at least one of the obtained plurality of data and the plurality of at least video data based on at least on historical data; and
    causing delivery of the composite at least video data and sensor data stream to the facility via the wireless interface for consumption thereat by a user of the facility, the delivery of the composite at least video data and sensor data stream comprising delivery of one or more predictive recommendations to an operator of the facility, the one or more predictive recommendations based on the one or more patterns.

2. The method of claim 1, wherein the consumption comprises rendering of the composite stream using a wireless-enabled modified reality (MR) apparatus worn by the user of the facility, the wireless-enabled MR apparatus enabling the user to roam the facility during said rendering.

3. The method of claim 1, further comprising:
    obtaining user gesture data, the gesture data obtained from the user during said consumption and relating to control of one or more of the plurality of sensors;
    backhauling the gesture data to the managed network node;
    processing the backhauled gesture data to determine a user command associated therewith; and
    based at least on the processing:
    (i) transmitting data configured to implement the user command to the facility via the wireless unlicensed interface; and (ii) modifying the composite at least video data and sensor data stream prior to delivery to the facility so as to reflect implementation of the user command at the facility.

4. The method of claim 1, further comprising causing display of at least a portion of the composite at least video data and sensor data stream via a user interface, the displayed at least portion of the composite comprising information associated with the plurality of data derived from a plurality of different sensors overlaid over one or more background images associated with the plurality of at least video data.

5. The method of claim 1, wherein the backhauling of the obtained plurality of data and plurality of at least video data via the wireless interface comprises backhauling via at least one of (i) a wireless communications protocol configured to utilize an unlicensed frequency spectrum, or (ii) a 3GPP (Third Generation Partnership Project)-based wireless communications protocol.

6. The method of claim 5, wherein the at least one of (i) the wireless communications protocol configured to utilize an unlicensed frequency spectrum, or (ii) the 3GPP (Third Generation Partnership Project)-based wireless communications protocol, comprises a wireless communications protocol configured for use within a Citizens Broadband Radio Service (CBRS) architecture.

7. The method of claim 5, wherein the at least one of (i) the wireless communications protocol configured to utilize an unlicensed frequency spectrum, or (ii) the 3GPP (Third Generation Partnership Project)-based wireless communications protocol, comprises a 5G NR (New Radio)-based wireless communications protocol.

8. The method of claim 1, further comprising:
    receiving data relating to one or more inputs from the user of the facility;
    process the received data relating to the one or more inputs so as to format the data relating to the one or more inputs to enable transmission; and
    causing distribution of the formatted data to at least a portion of the plurality of different sensors.

9. A non-transitory computer-readable apparatus comprising a storage medium, the storage medium comprising a plurality of instructions configured to, when executed by a processor apparatus of a computerized apparatus, cause the computerized apparatus to:

obtain video data from at least one video image data apparatus;
obtain additional sensor data derived from one or more sensors other than the at least one video image data apparatus;
transmit the obtained video data and the obtained additional sensor data to a server via at least a backhaul data interface, the backhaul data interface configured to transmit data via a managed network comprising a plurality of nodes;
cause generation of composite media data based at least on the transmitted obtained video data and the obtained additional sensor data; and
cause rendering of the composite media data on a user interface;
obtain user gesture data, the gesture data obtained from the user during consumption of the composite media data and relating to control of the one or more sensors;
transmit the gesture data to the server via at least the backhaul data interface, the backhaul data interface configured to transmit the gesture data via the managed network comprising the plurality of nodes, the server configured to perform inter-frame processing of the backhauled gesture data to associate a gesture to a user command associated therewith; and
based at least on the processing:
  (i) transmit data configured to implement the user command via a wireless interface; and
  (ii) modify the composite media data so as to reflect implementation of the user command.

10. The non-transitory computer-readable apparatus of claim 9, wherein:
the at least one video image data apparatus comprises a 360-degree camera;
the rendered media data comprises 360-degree video; and
the user interface comprises a display device configured to render at least a portion of the 360-degree video.

11. The non-transitory computer-readable apparatus of claim 9, wherein the one or more sensors comprise a plurality of Internet of Things (IoT)-enabled sensors, each configured to measure at least respective environmental data at a prescribed location equipped with said plurality of IoT-enabled sensors at geographically disparate portions of the prescribed location.

12. The non-transitory computer-readable apparatus of claim 9, wherein the computerized apparatus is backhauled to the managed network via a premises gateway and a hybrid fiber coax (HFC) infrastructure of the managed network.

13. The non-transitory computer-readable apparatus of claim 9, wherein the backhaul data interface comprises at least a wireless interface configured to utilize at least a 3GPP (Third Generation Partnership Project) 5G NR (New Radio) protocol within at least one of an unlicensed spectrum band or a quasi-licensed spectrum band.

14. The non-transitory computer-readable apparatus of claim 9, wherein the transmission of the obtained video data and the obtained additional sensor data comprises transmission to a modified reality (MR) device, the MR device configured to cause rendering of the composite media data, the rendered composite media data comprising human-readable information relating to the additional sensor data.

15. The non-transitory computer-readable apparatus of claim 9, wherein plurality of instructions are further configured to, when executed, cause the computerized apparatus to cause the video data and the additional sensor data to be processed so as to identify one or more patterns or events within the video data and the additional sensor data based at least on historical data.

16. A computerized apparatus comprising:
a processor apparatus;
one or more data interfaces in data communication with the processor apparatus; and
a non-transitory computer-readable apparatus in data communication with the processor apparatus and comprising a storage medium, the storage medium comprising a plurality of instructions configured to, when executed by the processor apparatus, cause the computerized apparatus to:
  receive sensor data from a plurality of sensors disposed within a facility, the facility comprising at least a farm;
  receive video data relating to the facility from at least an image data source associated with the facility;
  enable backhauling of the sensor data and the video data via the one or more data interfaces to a network node of a managed network via at least a CBRS (Citizens Broadband Radio Service) fixed wireless apparatus (FWA);
  enable generation of composite data from the sensor data and the video data; and
  enable delivery of the composite data to a client device disposed within or proximate to the facility.

17. The computerized apparatus of claim 16, wherein:
the client device comprises a virtual-reality device configured to render at least a portion of the composite data as at least a portion of a 360-degree video for viewing by a user of the facility; and
the backhauling comprises transmission via one or more of a first portion of the managed network or a second portion of the managed network, the first portion comprising a hybrid fiber coax (HFC) infrastructure of the managed network, the second portion comprising a wireless-enabled network configured to utilize one or more of a WLAN (wireless local area network) or a 3GPP (Third Generation Partnership Project)-based network.

18. The computerized apparatus of claim 16, wherein the sensor data comprises a first set of environmental data derived from respective ones of the plurality of sensors, the first set of environmental data comprising measurements corresponding to one or more of motion, temperature, or humidity, associated with the facility.

19. The computerized apparatus of claim 18, wherein the sensor data comprises a second set of environmental data derived from respective ones of the plurality of sensors, the second set of environmental data comprising measurements corresponding to one or more of $CO_2$ levels or barometric pressure, associated with the facility.

20. The computerized apparatus of claim 16, wherein the plurality of instructions are further configured to, when executed, cause the computerized apparatus to:
receive data representative of user input; and
distribute the data representative of user input to corresponding ones of the plurality of sensors, the distribution comprising transmitting one or more commands each via respective ones of the data interfaces.

21. The computerized apparatus of claim 16, wherein:
the sensor data comprises data suitable for delivery over either a low-bandwidth or high-bandwidth air interface;
the video data comprises data suitable for delivery only over a high-bandwidth air interface; and the backhauling of the sensor data and the video data via the one or more data interfaces to a network node of a managed network via at least a CBRS (Citizens Broadband Radio Service) fixed wireless apparatus (FWA) comprises:
- backhaul of at least a portion of the sensor data via at least one low-bandwidth long range air interface;
- backhaul of at least a portion of the video data via at least one high-bandwidth short range air interface;
- backhaul of the backhauled at least portions of the sensor data and video data via the CBRS FWA to the network node via a CBRS CBSD (Citizens Broadband Service Device).

22. The computerized apparatus of claim 16, wherein the managed network comprises a hybrid fiber coaxial (HFC) network, and the backhauling of the sensor data and the video data via the one or more data interfaces to the network node of a managed network via at least a CBRS (Citizens Broadband Radio Service) fixed wireless apparatus (FWA) comprises backhaul to the network node via a CBRS CBSD (Citizens Broadband Service Device) which is backhauled to the network node by at least one of coaxial cable or optical fiber, of the HFC network.

* * * * *